United States Patent [19]

Joseph et al.

[11] Patent Number: 5,485,600
[45] Date of Patent: Jan. 16, 1996

[54] COMPUTER MODELLING SYSTEM AND METHOD FOR SPECIFYING THE BEHAVIOR OF GRAPHICAL OPERATOR INTERFACES

[75] Inventors: Eugene R. Joseph, Montreal, Canada; Michael Trachtman, Eugene, Oreg.

[73] Assignee: Virtual Prototypes, Inc., Montreal, Canada

[21] Appl. No.: 972,779

[22] Filed: Nov. 9, 1992

[51] Int. Cl.$^6$ ........................................ G06F 17/50
[52] U.S. Cl. .................. 395/500; 395/161; 364/190; 364/191
[58] Field of Search ........................ 395/500, 159, 395/161; 364/578, 188, 189, 190, 191, 192, 146, 147, 474.22, 474.23, 474.24, 474.26, 474.27

[56] References Cited

U.S. PATENT DOCUMENTS

| | | | |
|---|---|---|---|
| 4,315,315 | 2/1982 | Kossiakoff | 395/700 |
| 4,849,880 | 7/1989 | Bhaskar et al. | |
| 4,860,204 | 8/1989 | Gendron et al. | 395/700 |
| 4,868,785 | 9/1989 | Jordan et al. | 395/140 |
| 4,870,561 | 9/1989 | Love et al. | 395/500 |
| 4,914,568 | 4/1990 | Kodosky et al. | 364/578 |
| 5,251,159 | 10/1993 | Rowson | 395/500 |
| 5,255,363 | 10/1993 | Seyler | 395/149 |
| 5,261,043 | 11/1993 | Wolber et al. | 395/159 |
| 5,297,250 | 3/1994 | Leroy et al. | 395/157 |
| 5,325,481 | 6/1994 | Hunt | 395/157 |

OTHER PUBLICATIONS

"Vaps by Example," Virtual Prototypes Inc., 1991.
"Vaps Installation Guide and Options," Virtual Prototypes Inc. 1991.
"Vaps Conceptual Overview," Virtual Prototypes Inc., 1991.
"Vaps Reference Guide," Virtual Prototypes Inc., 1991.
"Vaps Programmer's Guide," Virtual Prototypes Inc., 1991.
"Vaps Overview," Virtual Prototypes Inc., 1993.
"Vaps with stateforms Reference Guide," Virtual Prototypes Inc., 1993.
Research Disclosure No. 317, Sep. 1990, Emsworth, GB, p. 749 Disclosure No. 31761 "Intelligent Object–Oriented Graphics".
IEEE Software, vol. 6, No. 3, May 1989, New York, US, pp. 15–23, Brad A. Myers: "User–Interface Tools: Introduction and Survey".
Proceedings of the European Computer Graphics Conference and Exhibition (Eurographics '89), 4 Sep. 1989, Hamburg, FRG, pp. 3–14, Qijing Mao: "Micro–UIDT: A User Interface Development Tool".

Primary Examiner—Parshotam S. Lall
Assistant Examiner—Richard Ellis
Attorney, Agent, or Firm—Lowe, Price, LeBlanc & Becker

[57] ABSTRACT

A computer simulator system allows the user to specify prototype reaction to events in a pictorial manner using a visual object environment. A spreadsheet like State Table and a visual object collection coincide on a common graphical display. The State Table is filled in by pointing to lists of events or actions associated with the different objects. The contents of these lists are dependent on the object class. Event or action descriptions are transported into the respective cells of the State Table in the form of descriptive strings of text. This text describes the event or action, and the event source, or action destination. Entries in the State Table define the operation of the simulation and are executed directly by an interpreter or are compiled to generate a program of instructions for performing the simulation.

37 Claims, 23 Drawing Sheets

| | STATE | EVENT | ACTION | NEXT STATE |
|---|---|---|---|---|
| | | | | |
| | | | | |
| | | | | |
| | | | | |
| | | | | |
| | | | | |

| EVENT | ACTION |
|---|---|
| KNOB speed_knob (KNOB_VAL<500) | Drive_Light("","speed_light",1); |
| KNOB speed_knob (KNOB_VAL>=500) | Drive_Light("","speed_light",2); |

| STATE | EVENT | ACTION | NEXT STATE |
|---|---|---|---|
|  | KNOB speed_knob (KNOB_VAL<500) | Drive_Light("","speed_light",1); |  |
|  | KNOB speed_knob (KNOB_VAL>=500) | Drive_Light("","speed_light",2); |  |

|  | STATE | EVENT | ACTION | NEXT STATE |
|---|---|---|---|---|
| OBJECT EVENTS | | LOCATOR_DOWN | /* This and the next two are events which | |
| | | LOCATOR_DRAG | * can happen from LOCATORs | |
| | | LOCATOR_RELEASE | */ | |
| | | FIELD | /* There are three variants of the FIELD | |
| | | FIELD VALID | * event. These occur when the user types | |
| | | FIELD INVALID | * In data to an input field. */ | |
| OTHER MOUSE INPUT | | NODEVICE | /* This event occurs if you click on the background */ | |
| ACCEPT ANY EVENT | | ANYEVENT | /* Accept any event which comes your way. */ | |
| STATE TRANSITION EVENTS | | FIRST_TIME | /* This event occurs the first time you enter this state */ | |
| | | INITIALLY | /* This occurs when entering the state */ | |
| | | IMMEDIATE | /* This occurs initially, and after every reaction */ | |
| | | FINAL | /* This occurs if a transition to another state will occur */ | |
| COMMENT | | COMMENT | /* This is not an event, just a comment */ | |
| PHYSICAL INPUT | | SERIAL | /* Input from a physical input device (in/dev) */ | |
| TIME BASED EVENTS | | PERIODIC nn HZ | /* This event occurs repeatedly every second */ | |
| | | PERIODIC nn secs | /* This event occurs repeatedly every few seconds */ | |
| | | ON TIMEOUT nn secs | /* This event occurs repeatedly every few seconds */ | |
| USER DEFINED | | USER | /* User defined event */ | |
| | | WHENEVER | /* A pseudo event */ | |

FIG. 7

| STATE | EVENT | ACTION | NEXT STATE |
|---|---|---|---|
| LOW | FIRST_TIME | Get_Frame("","control_panel",1, FOREGROUND_FRAME); | |
| | KNOB speed_knob | Drive_Dial("","speed_dial",KNOB_VAL); | |
| | SWITCH gear 'HIGH' | Drive_Dial("","speed_dial",KNOB_VAL*2); | HIGH |
| HIGH | KNOB speed_knob | Drive_Dial("","speed_dial",KNOB_VAL*2); | |
| | SWITCH gear 'LOW' | Drive_Dial("","speed_dial",KNOB_VAL); | LOW |

FIG. 8

| STATE | EVENT | ACTION | NEXT STATE |
|---|---|---|---|
| | FIRST_TIME | Get_Frame("","CONTROL_PANEL", 1,FOREGROUND_FRAME); | |
| | IMMEDIATE | fprintf(data_log,"%1%1%rn", KNOB_VAL,POTEN_VAL); | |
| | KNOB speed_knob_1 | Drive_Dial( ); | |
| | POTENTIOMETER speed_knob_2 | Drive_Dial( ); | |

FIG. 10

| STATE | EVENT | ACTION | NEXT STATE |
|---|---|---|---|
|  | FIRST_TIME | Get_Frame("","CONTROL_PANEL", 1,FOREGROUND FRAME); |  |
|  | IMMEDIATE | Drive_Dial("","speed_dial", knob1+knob2); |  |
|  | KNOB speed_knob_1 | knob1=KNOB_VAL; |  |
|  | KNOB speed_knob_2 | knob2=KNOB_VAL; |  |

FIG. 11

| ACTION PARAMETERS |  |
|---|---|
| Object: LIGHT/TrafficLight | |
| Action: Change State | |
| Name Of State: | RED_LIGHT |

FIG. 14

| ACTION PARAMETERS | |
|---|---|
| Object: XY OBJECT/Car Icon | |
| Event: Move_Object | |
| Anchor | RELATIVE_TO_CRT |
| X Coordinate | 0.5 |
| Y Coordinate | 0.5 |

FIG. 15

| Parameter Value<br>Field Name: NAME_OF_STATE<br>Object: LIGHT/TRAFFIC_LIGHT<br>Type: STATE_NAME |
|---|
| RED_LIGHT |
| GREEN_LIGHT |
| YELLOW_LIGHT |
| LEFT_TURN_LIGHT |
| WALK_LIGHT |

| Parameter Value<br>Field Name: ANCHOR<br>Object: XY OBJECT/Car Icon<br>Type: ANCHOR_TYPE |
|---|
| RELATIVE_TO_CRT |
| RELATIVE_TO_FRAME |
| ABSOLUTE |
| SCALED_TO_FRAME |

| Prameter Value<br>Field Name: X Coordinate   Object: XY OBJECT/Car Icon   Type: float |
|---|
| Enter Value (0.0,3.0) |

Examples of EVENTS for an object class:

Object Class: KNOB

KNOB_TURNED
    KNOB_MOVED
    KNOB_PRESSED

Object Class: FIELD

FIELD VALID
    FIELD INVALID
    FIELD

FIG. 22

Examples of EVENTS that apply to no object class:

Object Class: NONE

NO_DEVICE
    ANYEVENT
    FIRST_TIME
    INITIALLY
    IMMEDIATE
    FINAL
    COMMENT
    PERIODIC
    TIMEOUT
    USER

Examples of ACTIONS for an object class:

Object Class: LIGHT

Light_Change_State        /*This changes the mode of the light.*/
    Object_Change_Black_Color  /*This applies to all objects which have a
                                          *background color.*/
    Object_Move                 /*This applies to all movable objects.*/

Object Class:FIELD     /*Text field can be input,output,or both in and out*/

Object_Change_Back_Color   /*This applies to all objects which have a
                                          *background color.*/
    Object_Move                /*This applies to all movable objects.*/
    Text_Font_Change         /*This applies to all movable objects
                                          *that have text in them.*/

Field_Set_Default         /*For a text field, set its default value.*/
    Field_Set_Validation      /*Set the validation rules for the field*/
    Field_Set_Value           /*Set the value of a field.*/
    Field_Restore_Default     /*Set the value of the field to the default
                                          *value.*/

FIG. 23

Examples of ACTIONS that apply to no object class:

Object Class:NONE ramom_number     /*Compute a random number*/
    print_display      /*Send a copy of the display to the printer*/
    set_color_list     /*Add names to the color table.*/
      exit            /*Stop all processing*/

FIG. 24

| STATE | EVENT | ACTION | NEXT STATE |
|---|---|---|---|
| RED | FIRST_TIME | Get_Frame("","TRAIN",0,FOREGROUND_FRAME); | |
| | INITIALLY | Drive_Dial("Speedometer",ZERO,VAL);<br>Drive_Light("Traffic_Light","RED"); | |
| | BUTTON change_light | | GREEN |
| GREEN | INITIALLY | Drive_Dial("Speedometer",POTEN_VAL);<br>Drive_Light("Traffic_Light","GREEN"); | |
| | POTEN speed_control | Drive_Dial("Speedometer",POTEN_VAL); | |
| | BUTTON change_light | | YELLOW |
| YELLOW | INITIALLY | float desired_speed;<br>Drive_Light("Traffic_Light","YELLOW");<br>desired_speed = POTEN_VAL;<br>If (desired_speed > 20.0) desired_speed = 20.0;<br>Drive_Dial("Speedometer", desired_speed); | |
| | POTEN speed_control | float desired_speed;<br>desired_speed = POTEN_VAL;<br>If(desired_speed > 20.0) desired_speed = 20.0;<br>Drive_Dial("speedometer",desired_speed); | |
| | BUTTON change_light | | RED |

FIG. 30

COMPUTER MODELLING SYSTEM AND METHOD FOR SPECIFYING THE BEHAVIOR OF GRAPHICAL OPERATOR INTERFACES

BACKGROUND OF THE INVENTION

1. Field of the Invention

The invention relates to a system for and method of interactive, graphical computer simulation and, in particular, to a system and method for providing user programming of interactive, graphic and dynamic applications through pictorial means.

2. Description of the Related Art

Digital computers have long been used to perform complicated and tedious numeric calculations and data processing. With increased processing speed and memory capability, the roles of digital computers have expanded to include real-time modelling of mechanical, electrical, and other complex systems.

Definition. A computer graphics model visually resembles a product/system that is modelled, or represents the way a user thinks about a system without a direct visual analogy. A computer graphics model of a system or product may be used for developmental purposes (tradeoffs, human factors analysis, simulation), as the actual system/product operator interface, or for training purposes.

At first, software for performing digital computer modelling required advanced programming skills, the programmer coding the instructions in a low level language such as assembly language or machine code. This was done to provide the necessary interface between operator inputs and graphic objects displayed on an output device such as a graphic display or video monitor. With the development of high level languages, it became feasible to construct program generator systems to assist in the development of programs for performing the modelling. An example of such a modelling system is the Virtual Applications Prototyping System (VAPS) commercially available from the assignee of the subject application. The system is disclosed in system documentation publications including "VAPS: Conceptional Overview"; "VAPS: Reference Guide"; "VAPS: Programmers's Guide"; "VAPS by Example"; and "VAPS: Installation Guide and Options" all by Virtual Prototypes (1991) and incorporated herein by reference.

The VAPS system is a tool for designing, testing, and implementing user interfaces. A prototype or "modeled" system is the result of the design work done with design tools constituting the VAPS modelling system. A user interface is a part of hardware and software that provides for human control and feedback. For a software program, human control and feedback can include graphs, menus and prompts. For a product such as a radio, the interface can include scales, dials, and knobs. Thus, the user interface is a bridge for a human to access an application.

The resultant virtualized "prototype" system is a graphics model of a control and display mechanism which can be equivalent in appearance, form, functionality, behavior, animation, etc. to the modeled system and can also abstract parts of it. The virtualized prototype representation is also applicable to the generation of source code implementing equivalent functionality on a target system. Thus, as used herein, the prototype system is functionally equivalent to a modeled system. However, while the virtualized system is termed to be a prototype, it is not limited to initial system development but may constitute the final target system.

The VAPS system supports development and testing of dynamic, data driven graphical front ends for existing applications and maintenance of the user interface by allowing changes to be made visually. VAPS contains four primary modules or subsystems: (i) an Object Editor, (ii) an Integration Editor, (iii) a Logic Editor, and (iv) a Runtime Environment.

Briefly, the Object Editor is used by the operator to build the visual interface to the application. Using the Object Editor, the user draws objects that make up the graphical interface for the prototype. The objects are then assigned runtime behavior. The user employs the Integration Editor to define and build data connections or routes between the visual interface and an Application program data. That is, after the display image is produced using the Object Editor, the Integration Editor connects objects to each other, to data sinks, and to data sources. At the system level, data connections can be made by defining global prototype/applications system variables.

The Logic Editor allows the user to define and specify how events are to be managed. Using the Logic Editor, the user can develop a logic control program to manage events from the user interface. Finally, the Runtime Environment animates the prototype and allows the user to interact with the prototype.

In the VAPS system, the Object Editor is a window-based, graphical system used to draw and describe objects that make up a man-machine interface (MMI.) The VAPS MMIs are collections of objects having a visual representation created by the user and a functional behavior assigned to the graphical representation.

The Object Editor allows the user to build the "functional behavior" exhibited by complex objects or displays in runtime by specifying a list of object descriptions. The functional behavior of an object refers to how the graphic representation of an object responds to data received or generated by the prototype.

The object descriptions include two types of objects: input and output objects. In general, input objects react to user control to supply data to the simulation program representing the "prototype" or "modeled" system. Output objects react to data generated by the input objects, as well as to internal and external data sources of data. Output objects reflect the data by changing appearance in accordance with the predefined functional behavior of the respective object type. Thus, an output object such as a virtual meter might be graphically represented by a graduated scale and a pointer, the position of the pointer relative to the scale being responsive to predefined data generated by the prototype system.

Input objects accept user inputs and pass data to the system for processing. Typical classes of virtual input objects include buttons, locators, menus, knobs, switches, event labels, input fields, etc. Virtual input objects can be defined to be responsive to a corresponding physical input device, such as a mouse, keyboard, touch screen valuator, or a custom device. When a hardware system is modeled, the term "virtual object" as used in the specification and claims of this document is a graphical object that visually and functionally represents a real device usable for input/output purposes. When something other than a hardware system is modeled the term "virtual object" as used in the specification and claims of this document is a visual object with a well defined animation and/or behavior. The terms are used interchangeably in this document.

Once the application program has processed the information, the results are displayed on a video monitor screen using output objects. Typical classes of output objects include dials, lights, plots, cursers, bar charts, tapes, output fields, etc. Thus, output objects are different representations enabling viewing of data generated by the application. When the data changes, the output objects are dynamically modified to reflect the new value.

The functionality, i.e. behavior, of objects is defined using property sheets. The contents of a property sheet are dependent on the class of the object described by the property sheet. For example, a property sheet for a dial class (i.e., rotational) object defines the name of the object, display position origin, moving part, center of rotation, position pointer, initial pointer position, direction of motion, type of motion, and minimum and maximum positions and corresponding values.

As described, the Object Editor is used to draw the visual portion of the simulated prototype and define the functionality of objects. The Integration Editor Subsystem animates the objects by providing a data connection to the application data. Connections are made with the Integration Editor by specifying a correspondence or mapping between an object and a data source or data sink.

For example, if a "Dial" type of output object represents the temperature in a boiler, the temperature can be changed by an external source. The correspondence between the temperature and the Dial reading is made in the Integration Editor. Similarly, an input object that is created and functionally defined in the Object Editor is connected via globally defined data to provide user input to the application program.

Integration produces a data connection allowing virtual input objects to transmit data and output objects to receive data. The data controls the functional behavior of a virtual object or alters the attributes of a virtual object, such as a displayed position or shape of the virtual object.

Using the Integration Editor, data connections to and from a virtual object are made through a data channel. Data connections between virtual objects can be made from one virtual object to a series of other virtual objects. This is accomplished by storing the variable information from an input virtual object in a memory location, referred to as a data channel, and connecting the one or more output virtual objects to the same memory location to read the updated variable.

Data generated or consumed by data generators or consumers of the prototype interface are connected through direct point-and-click connections. Thus, an output virtual objects can directly receive data generated by the MMI. As used herein, "point-and-click" and "click on" refer to designation of an element or virtual object displayed on a video monitor. This is typically accomplished using a mouse, joystick, touch screen or other graphic input device to position a cursor displayed on the monitor (i.e., point) and activating a momentary switch to designate the element or virtual object at the cursor position (i.e., click or click-on) for further processing.

External user-defined application programs can also provide data. The memory locations for input and output virtual objects can be configured to transfer data to and from an external user application program, with the application program reading and writing to predefined data channels.

Finally, real devices can be directly integrated into the prototype with the interface. Such real devices include input devices such as sensors, joysticks, trackballs, and keyboards.

The Integration Editor maps user input and output information to data locations without regard to where the data originates. A pictorial interface maps data to provide a direct outlet to a virtual object called a plug. All virtual objects have such an associated plug, i.e., a labeled data location accessible under program control, to make the data available to virtual objects and applications programs. In comparison with having to program memory connections through a programming language, mapping using the Integration Editor allows the user to define how the virtual objects of the prototype are to communicate with each other by passing data back and forth using plugs.

Each mapping variable is defined by making a pictorial connection between the plug and the data source or sink associated with a virtual object. Therefore, when a virtual input objects of a prototype are connected to other data sources or sinks, only the information mapping needs to be changed, not the individual virtual object definition. Real devices can replace some or all the virtual objects, by being connected to the same data channel where a virtual object was connected, and inputting/outputting data in the same format.

Collectors are used to define required combinational Boolean or mathematical functions for application programs requiring the combination of several input sources to drive a single output virtual object. Collectors can also be used to determine a critical state by comparing an input value with a threshold value.

Data connections are also used to interface input objects of a prototype with an external application program. For example, interactive application programs may require control and display data interfaces to a prototype. The interface provides data communications between virtual objects and externally provided data. The development system also defines and provides communications with databases using connecting variables and remote or local communications.

The Logic Editor is used to model the prototype system by defining prototype system states and events. The Logic Editor uses a Finite State Machine (FSM) concept as the framework for MMI decision-logic development. This allows the prototype system to manage events in a context that takes system history into account and supports a fine-grained modelling of system functionality, potentially enhancing system reliability.

Prototype system behavioral modelling with the FSM concept produces a model containing a finite number of states. Each prototype state is entered and exited based on the occurrence of an event. Events can be user, environment or application generated.

To handle FSM modelling, the Logic Editor uses an Augmented Transition Network (ATN) language. The ATN language provides a structure for recognizing events and servicing transitions between prototype system states. Transitions are serviced by invoking action routines and then transitioning or moving to the next state.

The Logic Editor is used to produce an ATN program and define prototype system operation. The ATN language has two basic constructs, the STATE and the EVENT. These constructs map to the nodes and links of a conventional state diagram to define prototype interface decisions, i.e., provide logic control and action routines. The general structure of an ATN program is as follows:

```
STATE start_state
    { initialize the state's parameters if required }
    ( EVENT event1) (condition) { response }
```

-continued

→ NEXT_STATE
( EVENT event2) (condition) { response }
→ NEXT_STATE etc.

The design information captured by the Object Editor, Integration Editor and Logic Editor is available in a well-defined documented ASCII format, whereby for each object, this information includes all details regarding object class, object interfaces to controlling variables and object graphical primitives, attributes and transformations. The ATN network description also follows a well-defined grammar.

When a virtual event occurs, the prototype system is in a particular predefined state. The prototype system checks that the event that has occurred matches one of the transitions (i.e., an event and a condition) declared in that state. If the event is matched and the condition is true, i.e., valid and passed, the prototype system executes the response by executing a number of routines. These routines are programs, for example C subroutines. The prototype system then proceeds to the next state, awaiting other virtual events. Thus, the ATN code is used to define decision making of the prototype system.

Input events can be received by the ATN program and output virtual objects can be addressed by action routines invoked by the ATN program. The MMI can respond to events originating from many sources, including data entry, selection, discrete device input (such as a button, switch, input field, etc.), a continuous discrete device input reaching an increment (such as a potentiometer, knob or locator), time-out, periodic event, variable value crossing a threshold, voice input or a user-definable event.

When hardware is modelled, events can originate from real hardware devices, or "virtual hardware" (computer graphics replicas of similar look and functionality).

In order to service events, action routines are dispatched, i.e., invoked to service the event. The prototype development system makes libraries of action routines available to fulfill a variety of functions including performing specific object operations, manipulating graphical images and virtual objects on a virtual CRT screen, altering line types, patterns, fonts, and colors under program control, performing geometric transformations under program control, writing to output fields and reading from input fields, type checking for strings, communicating with an external simulation via Ethernet or other specialized buses, and remapping object plugs.

Once the functionality of the user interface is completed using the Object Editor, Integration Editor, and Logic Editor, the dynamics of the prototype are displayed at runtime in the Runtime Environment and the user is allowed to interact with the prototype through various real and simulated input devices. The Runtime Environments permits a user to evaluate the prototype and operation of the final MMI.

Using such a prototype development system, an essential part in the programming the human-computer interfaces for the prototype is to specify the behavior of the interface to virtual events. Such events may be generated by input devices (buttons, locators and triggers, keyboards, selects, function keys, touch screens, pictorial touch panels, voice interfaces) as well as by a timeout, a message from another system or a variable crossing a threshold value.

It is convenient to use a Finite State Machine (FSM) paradigm to respond to virtual events. Use of a FSM is suited to addressing sequencing problems often found in operator interfaces, and allows structuring of the control logic in an orderly, regular fashion.

When an FSM is used, events are processed in the context of a history of prior events and system states. A combination lock provides a good example of events interpreted in a context of prior events. Only the correct sequence will open the lock.

In another example, the pilot command "landing gear up" should only be serviced in the state "Weight-off-wheels" and not in the state "Weight-on-wheels". In a FSM, the system is deemed to be in one of a finite number of states. When input arrives, a transition is executed from the present state to the next state. The next state depends solely on the input and the present state. The output also depends solely on the input and the previous state. When applying the FSM model to operator interfaces, FSM input is made up of discrete events and FSM output is the dispatch of a series of subroutines or setting of plug variables. If a logical condition is tested before undertaking the transition, the FSM is an ATN.

ATNs or FSMs can be programmed with a text editor, by completing entries in a table or with a pictorial editor. However, textual completion of the table requires an in-depth knowledge of the syntax and structure of the ATN or FSM.

Accordingly, a need exists for an improved method and structure for defining the behavior of a system without requiring a knowledge of programming, FSM or ATN languages.

A further need exists for a method of, and structure for, defining a State Table using a graphical input and pull down, context sensitive menus.

A need further exists for a system to visually relate input and output virtual objects using a graphic input device.

A need further exists for a system which presents a user selection of valid relationships between virtual objects and available states.

A need further exists for a tool to specify a desired behavior using an graphic input device such as a mouse to point to, and designate, virtual objects which are part of the behavior and by designating desired virtual object behavior from menus.

SUMMARY OF THE INVENTION

The invention comprises a modelling system responsive to a graphic input device for defining relationships between and among objects displayed on a graphics display such as a video monitor. The relationships are defined by user completion of a State Table defining prototype system states, events or triggers, actions, and next states. Parameters are input to the table using a combination of images of objects appearing on the computer screen together with graphically designated menu selections and alphanumeric keyboard entries. Upon completion of the State Table, the parameters are translated into an Augmented Transition Network (ATN) which can then be further translated into a high level language like C, or directly interpreted for execution on a target platform running the simulation (i.e., workstation, personal computer, main frame, etc.). Thus, the prototype development and simulation system and method according to the invention directs the user to relevant valid choices defining relationships between virtual objects; displays and stores the relationships, actions, events, and responses as a spreadsheet-like State Table; and translates the State Table into a compilable program or executable language to be run on a target platform (e.g. computer) system.

According to the invention, the behavior of the system being modelled or actually implemented is defined using a graphical input device to designate virtual objects and specified relationships between and among the selected virtual objects. State Tables in the form of spreadsheets are completed by interacting with the image of an operator interface composed of virtual objects, and deriving virtual events or actions by clicking on the appropriate virtual objects.

Messages sent by a virtual object, or methods executed by it, can be arranged in a list (e.g., in a pulldown menu) and imported into the spreadsheet. For example, the event "Light XYZ is turned OFF" would be generated by clicking on the image of the object light XYZ, and extracting the event "Turn OFF" from a pop-up menus. Actions impacting virtual objects are specified in a similar manner.

In conjunction with the prior prototyping system described, which provides a graphical design environment for virtual object appearance, virtual object behavior and virtual object interfaces, the invention closes the loop for allowing full pictorial programming in the domain of dynamic, data driven graphical operator interfaces. Pictorial programming allows computer users who do not have a traditional programming background to carry out tasks that normally require programming knowledge, thereby expanding access to computer modelling and simulation.

The invention is further directed to a visual method of, and system for, programming interactive, graphical applications on a computer system which includes a graphical display and input devices, such as a mouse and a keyboard. The method is particularly well suited to programming graphical, dynamic, interactive operator interfaces. Dynamic operator interfaces include applications with a graphical output which changes to reflect the values of data represented by virtual objects.

The visual application is made up of objects, which have both a graphical representation and a behavioral model. The graphical representation of an object is defined using a graphics editor, or otherwise imported into the prototype system. A behavioral model is specified by a Property Sheet that maps a behavioral model for a virtual object to the visual representation. The mapping is specified by pointing to features of the virtual object, such as line of motion or center of rotation, or typing-in values.

The behavioral model is used to animate the virtual object in a manner consistent with the class of that object. For example, a "Dial" type of virtual object may be predefined to rotate while a "Scale" type virtual object translates, and a multi-state "Light" type virtual object assumes one of several graphical representations to simulate a physical light.

Virtual objects are connected to, or associated with, data values so as to animate the objects in response to the data. As the data changes, the virtual objects are redrawn to reflect the changed data value. This data can be generated by physical input devices, other objects, software programs residing on the same or another computer, etc.

The subject computer modelling system allows the user to specify the reaction to events in a pictorial manner, in a visual object environment. For this purpose, a spreadsheet like State Table and the visual object collection coincide on the same graphical display. The State Table is filled in by pointing to lists of events or actions associated with the different objects. The contents of these lists are dependent on the object class. Event or action descriptions are entered into the respective cells of the State Table, in the form of descriptive strings of text. This text describes the events or actions, and the event sources, or action destinations.

The State Table allows the user to specify prototype state names, logical conditions, and the name of the next prototype state for processing the next event, thus implementing an ATN control paradigm of the user interface. This information is supplied by a user employing an alphanumeric keyboard, selecting from lists, or copying parameters from other cells of the spreadsheet State Table. Other control paradigms can be implemented using the same method, such as FSM, Rule based systems, or Petri Nets. The data stored in the State Table is used to automatically derive the control program for the prototype.

Furthermore, in conjunction with the information stored in the virtual objects, a complete source code program can be generated. The source code program, when compiled, linked, and executed in the presence of appropriate data, produces the same visual appearance, animation behavior and interaction behavior to occur on a host computer system as on the original prototype development platform.

The invention includes a State Table Editor as an interactive module for specifying the behavior of a prototype using, for example, the commercially available Virtual Applications Prototyping System (VAPS). The State Table Editor or definition module interface is similar to a spreadsheet paradigm, in that the behavior of a prototype, i.e., responses of objects to data, events, and other virtual objects, is defined by completing a two-dimensional table, using a modern point, click and type interface.

The State Table Editor replaces the Logic Editor of VAPS to define relationships between and among virtual objects, events, states and actions. The State Table Editor is compatible the previous modelling system. Thus, Augmented Transition Network (ATN) language programs previously written using a Logic Editor are usable in the subject modelling system. In addition, ATN programs can be converted into State Tables and State Tables can be converted into ATN programs.

The State Table Editor allows the user to specify the behavior of a simulator prototype using a spreadsheet like interface. This spreadsheet is used to specify the desired behavior in terms of behavioral rules. Each behavioral rule is called a "Reaction". A reaction specifies how the prototype should respond to a specified event.

In its simplest form, a State Table specification for a prototype consists of a collection of Reaction Rules. This collection of rules is called a Reaction Table. More sophisticated prototypes can contain more than one rule set. Each rule set is called a state.

The State Table Editor has a "Point and Click" interface allowing the user to complete the State Table by clicking on the prototype elements, i.e., designating a virtual object by manipulation of a graphics cursor using a graphic input device such as a mouse. Then, using the mouse and/or a data entry device such as a keyboard, the user fills in the State Table to specify the desired behavior of the virtual object.

The State Table Editor package includes context sensitive menus and windows to enable an inexperienced user to define prototype behavior. It allows the expert user to describe even complex behavior, by providing access to an entire computer programming language such as "C" or ADA.

For example, if the user is specifying the behavior of an object, then the State Table editor displays or "pops-up" a window which enumerates all the functions which can be performed by that virtual object.

If the object is an input object, then all the input events which that virtual object can produce is shown in a menu. If the virtual object is an output object, then all the functions which can control the virtual object are displayed. Once the appropriate event or function is chosen, a second pop-up window allows the user to fill in the details/parameters of the virtual object. Default values are nominally provided. If the parameter can have only a predefined set of allowable values, then these values are also displayed in a pop-up menu.

The State Table Editor converts the sequence of key clicks and typed values into the appropriate textual syntax. The textual syntax describing an event is the ATN syntax for finite state machines (FSM). Actions are described in a programming language such as "C".

The State Table Editor provides a front end to the ATN capability of the prototype development system. The State Table defined by the user is translated into an ATN program which is compiled and used to drive the target prototype system at runtime.

The State Table Editor allows a user who has little or no programming experience to specify the desired behavior of a prototype by using a mouse to point to the virtual objects which are part of the behavior, and by choosing the desired behavior from context sensitive menus.

The foregoing and other objects, features, aspects and advantages of the invention will become more apparent from the following detailed description of the present invention when taken in conjunction with the accompanying drawings.

BRIEF DESCRIPTION OF DRAWINGS

FIG. 7 is a chart of reaction trigger sources;

FIG. 8 is a State Table defining using a FIRST_TIME trigger to define prototype responses;

FIG. 10 is a State Table including an IMMEDIATE event;

FIG. 11 is a prototype modified to include two virtual control knobs;

FIG. 14 depicts the display format of a Parameters Property Sheet;

FIG. 15 depicts the display format of another Parameters Property Sheet;

FIG. 16 depicts the display format of Parameter Value Windows;

FIG. 21 is a table or EVENTS for two example classes of objects.

FIG. 22 is a table of EVENTS not requiring specification of an object.

FIG. 23 is a table or ACTIONS for two example classes of objects.

FIG. 24 is a table of ACTIONS not requiring specification of an object.

FIG. 30 is a completed state transition table.

BEST MODE FOR CARRYING OUT THE INVENTION

Figure 1:
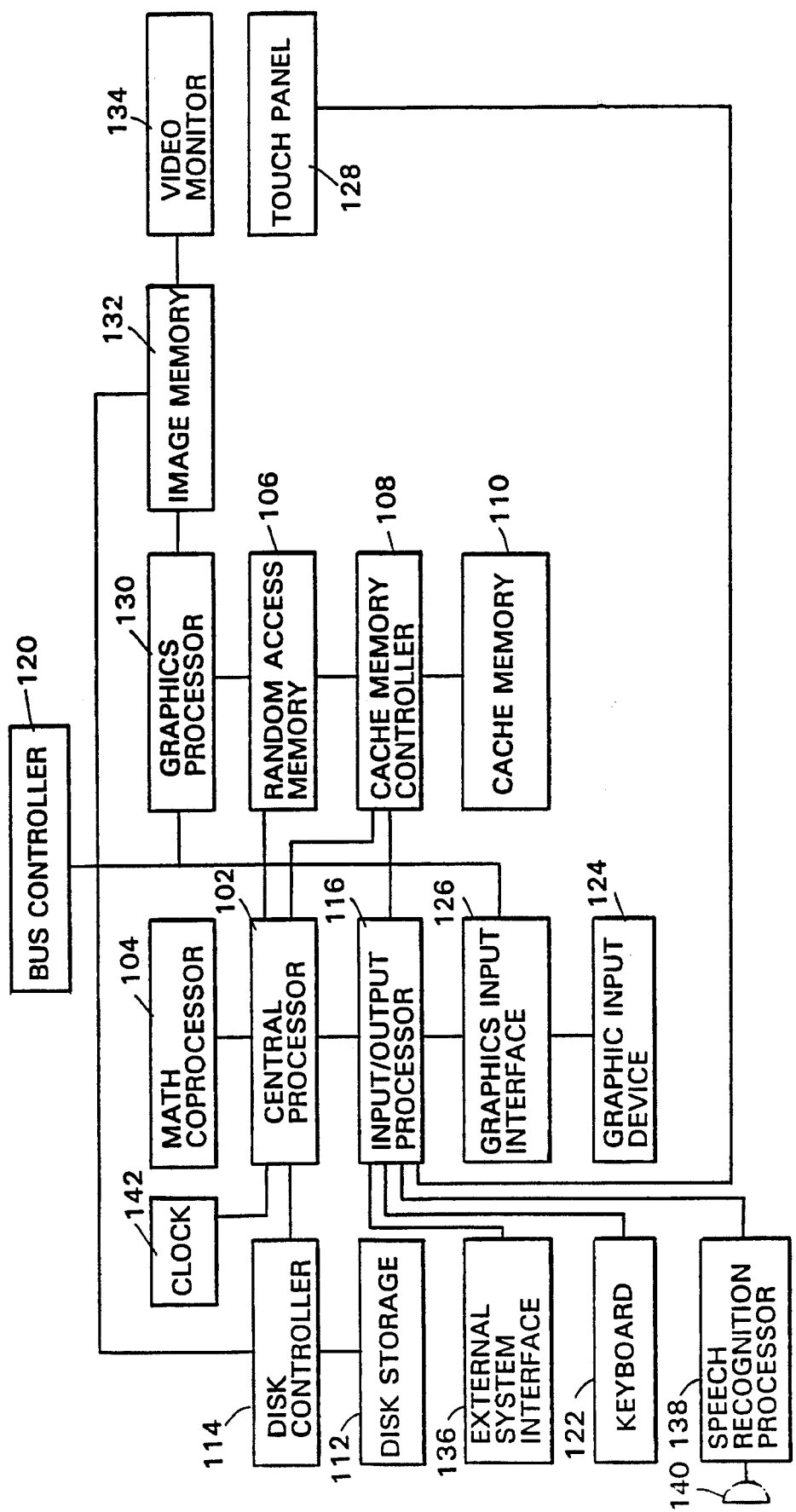
FIG. 1 is a block diagram of a processor platform according to the invention.

A computer platform for the development and simulation of a prototype is depicted in FIG. 1. A central Processor 102 is connected to a Math Coprocessor 104 for executing arithmetic and logical operations responsive to a program of instructions stored in Random Access Memory 106. The program of instructions includes an operating system such as Unix, software components of the prototype development system including (i) an Object Editor, (ii) an Integration Editor, (iii) a State Table Editor, and (iv) a Runtime Environment module, and data generated by each to define the prototype. The Runtime Environment module also supports execution of a simulation of the prototype in response to prototype behavior specified by a State Table defined by the State Table Editor.

To speed memory access, the platform includes a Cache Memory Controller 108 and Cache Memory 110 for storing frequently used instructions and data. Mass system storage is provided by Disk Storage 112 and Disk Controller 114. Central Processor 102 can access Disk Storage 112 through Disk Controller 114 either via Input/Output Processor 116 or over Data/Instruction Bus 118 under the control of Bus Controller 120. Input/Output Processor 116 also receives and formats data from Keyboard 122 and Graphics Input Device 124 via Graphics Input Interface 126, and Touch Panel 128. Graphics Input Device 124 may include a mouse, joystick, light pen, digitizing tablet, trackball, keypad, or other device for positioning a video cursor.

The resultant prototype simulation is generated by Graphics Processor 130 under the control of Central Processor 102. Graphics Processor 130 generates alphanumeric and primitive graphic image data either under direct control of Central Processor 102 or in response to lists of instructions or vectors stored in Random Access Memory 106. The image data is stored as a bit mapped image in Image Memory 132 and displayed by Video Monitor 134.

The computer platform also includes an External System Interface 136 for exchanging data with another computer system. Speech recognition is supported by Speech Recognition Processor 138 which receives speech sounds at microphone 140, interprets the sounds and provides a corresponding ASCII output string to Input/Output Processor 116. Finally, synchronous type operations of the computer platform are synchronized by System Clock 142 which also provides periodic interrupts signals at predetermined intervals set under software control.

Figures 2, 3:
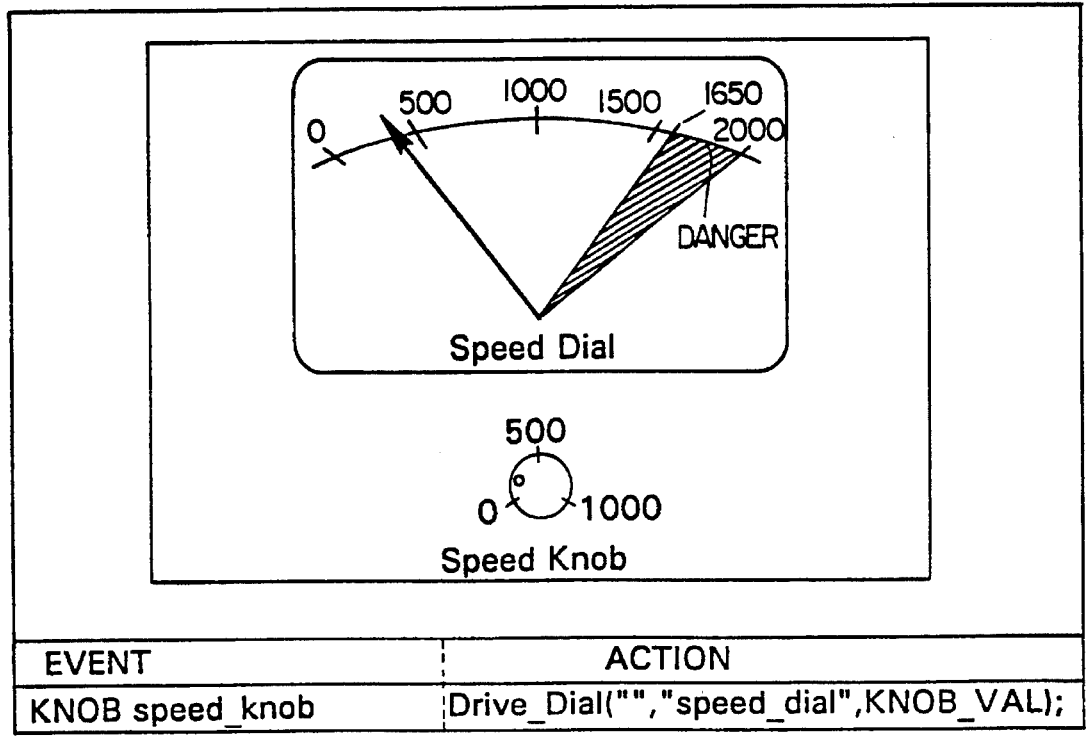
FIG. 2 is a blank state transition table.
FIG. 3 is a display used to define a reaction rule.

Referring to FIG. 2, the State Table is a two dimensional table with four columns and an unlimited number of rows. The four columns are:

1—State
2—Event or Trigger
3—Action
4—Next State

A State Table represents the behavior of a prototype simulation as a collection of Reaction Tables. The present invention provides a method of, and apparatus for, filling in the state table of FIG. 2 by controlling virtual objects on Video Monitor 134 in response to user input signals derived from any or all of Keyboard 122, Graphic Input Device 124 or Touch Panel 128. Context driven windows are displayed on Video Monitor 134 in response to user designation of cells of the state table to be completed, the windows providing lists of valid table entries for the selected cells.

A reaction rule specifies how the prototype should respond to events. The Prototype must respond to a user operating real input devices in the which affect virtual input objects of the prototype. Using Keyboard 122, Graphics Input Device 124 and Touch Panel 128, the user may push a virtual button, rotate a virtual knob or slide a virtual potentiometer graphically represented on Video Monitor 134. The simulator system responds to the inputs by affecting the output virtual objects of the prototype as displayed on Video Monitor 134.

For example, referring to FIG. 3, in response to the user activating a joystick or mouse of Graphic Input Device 124 or by manipulating the corresponding object using a touch screen to cause simulated rotation of the illustrated virtual knob the simulation system adjusts the illustrated virtual speed dial to display the value of the knob. This is described in a reaction rule as follows.

"KNOB speed_knob"

which is called the event part of the reaction rule, while

"Drive_Dial(" ", "speed_dial", KNOB_VAL);"

is called the action part of the reaction rule. The event or trigger part of the reaction rule is written using a syntax which is unique to the simulation system (i.e., ATN), while the action part is written in the "C" programming langauge.

More complex reaction rules are possible. For example, referring to FIG. 4, the prototype may contain a virtual knob and a virtual light selectively displaying one of two illumination levels, e.g., black and white. In the example, the light turns white whenever the value of the knob is less than 500, and turns black when the value of the knob is greater than or equal to 500.

Figures 4, 5:
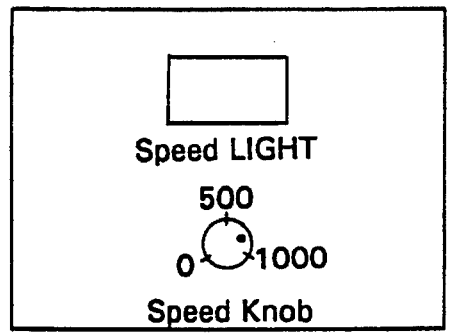
FIG. 4 is a display used to define a reaction table for an input virtual object.
FIG. 5 is a State Table implementing the reactions rules specified in the State Table of FIG. 4.

This relationship can be expressed with a pair of reaction rules. A collection of one or more reaction rules is called a reaction table as depicted in FIG. 5. The reaction table depicted in the figure has two reaction rules, with the event part of both reaction rules being two lines long. The first line gives the primary event or trigger which must occur for this rule to be triggered. This primary event is the knob turning. The second line of this reaction rule is called the condition of this event. The condition specifies that this reaction rule should only be taken if the value of the knob is <500. Conditions are also written in the "C" programming language.

Each of the two reaction rules have the same primary event as triggers. The rules differ only in the condition which must be true for the reaction to take place.

In the computer modelling system, a user enters a reaction table in the form of a state table. A prototype development State Table consists of one or more reaction tables. Only one reaction table is active at any given time. A simple simulator system State Table consisting of only one reaction table is depicted in FIG. 5.

Since the State Table has only one reaction table, the State and Next State columns of the State Table are left blank. When a State Table has more than one reaction table in it, each reaction table must be given a name. The name of each reaction table is called a state. When a State Table is executing, only one reaction table within the State Table is active at any given time.

A State Table thus consists of one or more states. When a prototype whose behavior is specified using a State Table is running, the prototype simulation system will be in one of the states given in the State Table. Thus, the word state is synonymous with "mode".

A prototype may be controlled by more than one State Table. For example, different virtual objects may be controlled by separate State Tables.

Each reaction rule can specify that a change in state should occur as part of the reaction to the rule being triggered. This change in state occurs in response to an Event and satisfaction of the corresponding Condition. When the event occurs, the prototype executes any actions specified in the action column in the rule. After the action has executed, the state of the State Table changes. Once the state of the State Table has changed, only the reaction rules specified for that new state are active.

Figure 6:
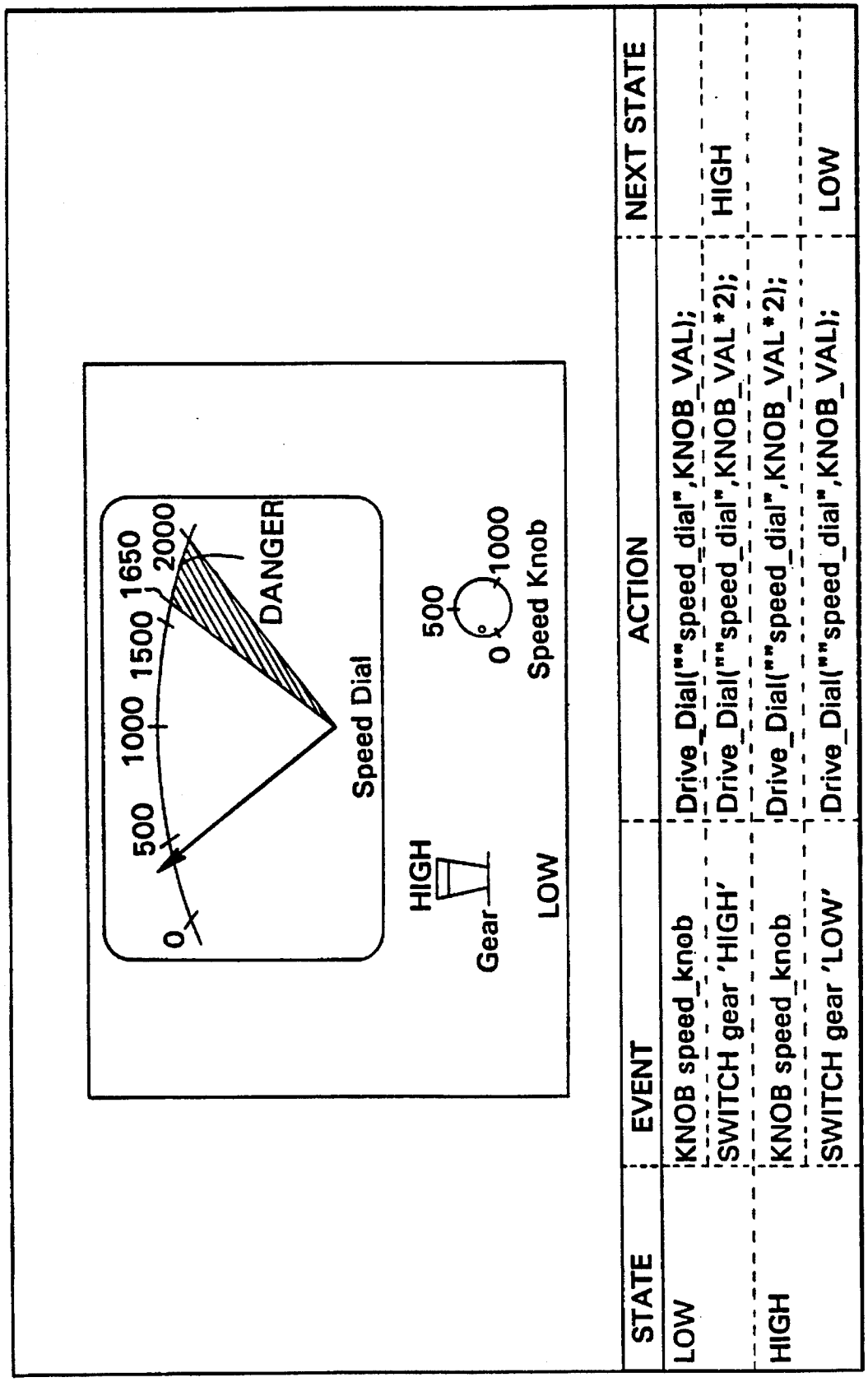
FIG. 6 is a State Table defining the operation of the depicted virtual objects.

FIG. 6 depicts a simple prototype and State Table having two states. The two states are called LOW and HIGH. When the State Table is in the LOW state, the value of the knob is copied to the dial. When the State Table is in the HIGH state, the value of the knob is doubled and copied into the dial. Flipping the GEAR switch toggles the State Table from the LOW to the HIGH state and back again.

Each of the two reaction tables shown in FIG. 6 has two reaction rules. The first reaction rule in the LOW state specifies an action in response to the user turning the knob. Since turning the knob does not change the basic mode of the Prototype, no mode change is required. Therefore, the NEXT STATE column is left empty.

The second reaction rule is also part of the LOW state. It specifies that whenever the switch is set to HIGH the State Table switches to the HIGH state. The dial is also reset to twice the value of the knob.

The HIGH state is structured similarly to the LOW state, except that, in the HIGH state, twice the value of the knob is sent to, and displayed on, the dial. As also defined in the HIGH state, the prototype simulation reverts back to the LOW state when the switch is switched back to LOW.

Another term used to refer to reaction rules is transitions.

The reaction rules described above all had events which were triggered by Virtual Input Objects. Other reaction triggers are possible. Reaction triggers can have one of the following sources:

1—An input virtual object generating events;
2—Clicking the mouse on the screen in an area unoccupied by a virtual object;
3—Events generated by Computer Programs;
4—Input from a Serial device of communications line;
5—Time based events;
6—Variables crossing thresholds; and
7—Inputs from real devices which are mapped to virtual objects.

Other reaction triggers are shown in the table of FIG. 7. The first group of events are examples of object events, i.e. events which are generated by using the mouse with virtual objects in the prototype. Some virtual objects have more than one input event associated therewith. Locators (e.g., mouse or joystick) have three different input events. The LOCATOR_DOWN and the LOCATOR_RELEASE event occur upon pressing and releasing the mouse in the active area of the Locator. The LOCATOR_DRAG event occurs when the location of the Locator is changed using the graphic input device on the active "touch" area of the display screen within the defined area of motion for the Locator.

Field events occur when the user types data into an input field, for which a "Read_Field( )" function has been invoked. A FIELD VALID event occurs if the value typed in is valid with respect to the syntax for the field. A FIELD INVALID event occurs if the value entered is not valid. In either situation, a FIELD event (without the VALID or INVALID qualification) is generated.

Referring to the Other Mouse Input Events entry, a NODEVICE event occurs if the user clicks somewhere in the prototype that is not within an active area of a virtual object. This event is received only if it is enabled in the Runtime Environment using the "Enable No Device Event" field in the Operational Settings of the Configuration menu.

The ANYEVENT trigger, responds to any event that occurs from input virtual objects, as well as any PERIODIC event which occurs. This is useful to detect and log stray events.

The next five events are generated internally within FSM in response to state transitions. The FIRST_TIME event occurs the first time that a given state is entered. This event does not occur a second time if the state is entered and exited and entered again. The FIRST_TIME event is often used to perform initial loading of a frame, wherein a frame is a collection of objects.

The INITIALLY event occurs each time that the a new state is entered from another state. This event is used to configure the display for the newly activated state. This may include the loading frames or changing the values of variables used by other transitions within that state. In contrast, the FIRST_TIME event is used to load the frame with the virtual objects only the first time the State Table is initially entered. Thus, the next transition has an INITIALLY trigger. In the previous example, whenever this transition is entered from another state, the dial is reset to the value of the knob. The dial is also set to the value of the knob each time a new input value is received from the knob. When the user toggles the gear switch to HIGH, the mode is switched to HIGH. There is no action associated with this state. Instead, the system has only associated a change in state with this reaction rule. Once in the HIGH mode, the INITIALLY reaction is performed. This causes the dial to be set to twice the value of the knob.

Figure 9:
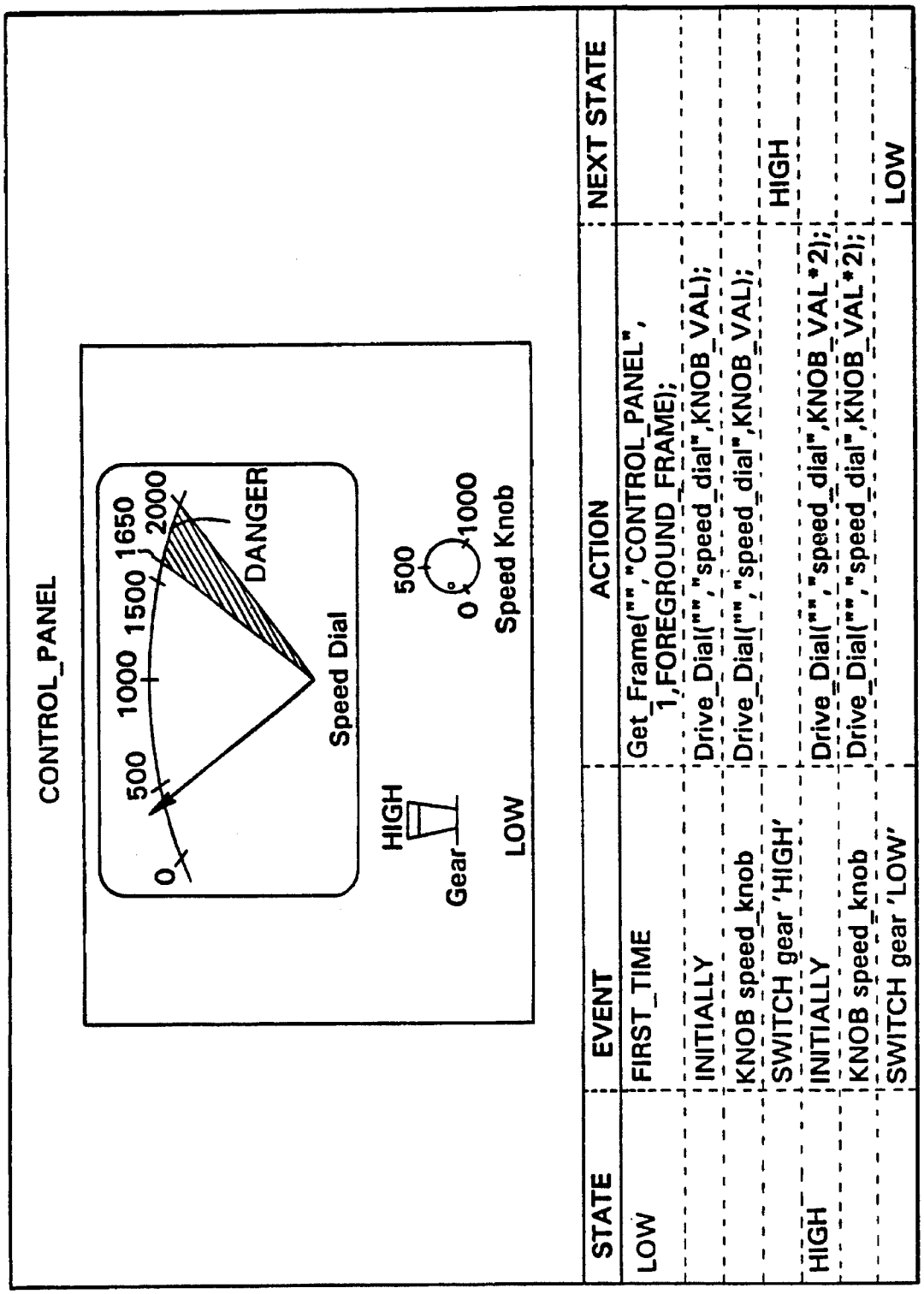
FIG. 9 is a display depicting a State Table using an INITIALLY trigger to define prototype responses and a simulation virtual object.
Figure 12:
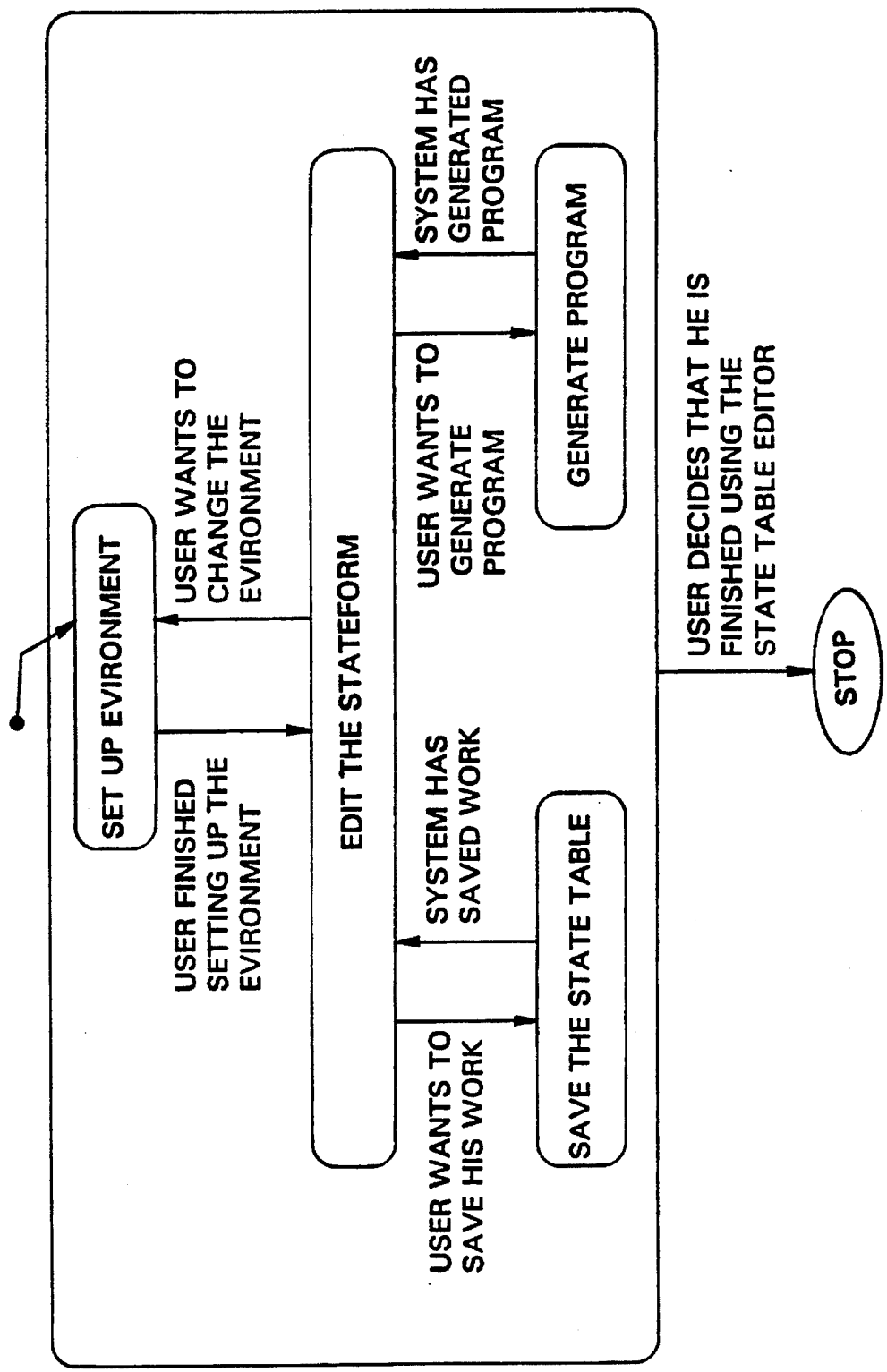
FIG. 12 is a flow chart depicting four phases of using the State Table Editor according to the invention.

The use of the INITIALLY event helps make the State Table clearer and easier to understand. Compare the State Table shown in FIG. 8 with that shown in FIG. 9. In the State Table of FIG. 8, it was necessary to place an action in the transition to cause the state to change when switching from one mode to another. Although this resulted in the desired behavior, it is conceptually incorrect, since all the uses of the action routine to set the value of the dial to twice the value of the knob should be encapsulated within the HIGH state.

The IMMEDIATE event is invoked each time that a state is entered, as well as after each reaction in which the state did not change. An application of the IMMEDIATE event is to perform data logging.

Referring to FIG. 10, different transitions are taken in response to different input events. In all cases of a transition being taken, a log entry is made. Another use of the IMMEDIATE event is when there is an output virtual object in the display which can be affected by one of many input virtual objects. In these cases, rather than driving the output virtual object from within, transition routines can be factored out which drive the output virtual object, and place it in the IMMEDIATE action. An example of such a use of this event is depicted in FIG. 11.

Referring to FIG. 11, the prototype includes two knobs. The prototype displays the sum of the values represented by the two kinds on the dial. This is accomplished by storing the value of the knob in the reactions which respond to the knobs being turned, and driving the dial with the sum of the values in the IMMEDIATE event response.

The FINAL event occurs when leaving a state. It occurs only if there is a NEXT_STATE filled in, and the NEXT_STATE is different from the current state. In this case, the action associated with the FINAL event is executed before the transition to the next state. A typical use of the FINAL state is to undo any actions performed in response to the INITIALLY event upon entering the state. A typical example is unloading of frames which were relevant only within that state being left.

The Pseudo Event COMMENT, has no operational effect. The remainder of the line is treated as a comment and ignored. Comments can also be entered as "C" language comments, i.e. between /* and */. For example:

/* This is a comment */

The prototype design system also provides two time based events. The first one is called PERIODIC. The PERIODIC event occurs repeatedly at the specified frequency. The syntax for this is PERIODIC nn HZ where nn is the frequency of the event in HERTZ. The PERIODIC event can be used to increment counters, or implement samplers which change the display at specified intervals.

The clock which generates the PERIODIC event is a global clock. This means that the PERIODIC clock is not reinitialized upon entering a state.

The other time based event is the ON TIMEOUT event. The syntax for this is:

ON TIMEOUT nn SECS

In this notation, nn must be a positive integer. This event occurs nn seconds after entry of the state and is used, for example, to detect if the user has failed to timely enter data or to determine if the user has finished entering data. The ON_TIMEOUT is reset upon occurrence of a reaction or state change.

In addition, there are two user defined events. The first user defined event is called USER which is generated by a user program. The USER event takes two parameters; the name of the USER event and the value of the event.

The syntax for using USER generated events is:

USER User_Event Name 'User_Event Value'.

The USER event is generated within another ATN using the routine Generate_User_Event. The syntax is:

Generate_User_Event("User_Event_Name", "User_Event_

Value");

User generated events are used where multiple State Tables are concurrently executing. These State Tables can signal each other using customized events.

As described above, the prototype development system consists of four main components. The Object Editor (OE) allows the user to draw virtual objects by specifying the shape, color, placement and texture of the graphical objects and ascribe to each an appropriate class of behavior. For example, if a dial is drawn, it can have any shape, or color.

The Integration Editor (IE) allows the user to specify the names of data variables which control the redrawing at run time of virtual objects or the variables in which objects input data. For example, if a virtual object is a dial, a particular variable can be made to control the angle of the "needle/ pointer" on the dial.

The third component is the State Table Editor. This component allows the user to specify more complex behavior than possible using the Integration Editor of the previous systems. For example, in the Logic Editor (LE), the user can arrange to have virtual objects appear or disappear when a particular button is pressed and a particular condition is outstanding. The State Table Editor instead uses State Transition Programs, augmented with "C" programming code. The State Table Editor replaces the (Logic Editor) LE of previous modelling systems.

The fundamental difference between the State Table Editor and the LE is ease of use. The State Table Editor significantly reduces the user explicit programming required to specify the behavioral specification for a simulator prototype.

The final component of the simulator is the Runtime Environment (RE). The RE integrates the information entered using OE, IE and State Table Editor and runs the specified interactive graphical display in the presence data.

The are four phases to using the State Table Editor are shown in the flow chart of FIG. 1. When invoking the State Table Editor, the user initially sets up the environment of the prototype development system. Once the user has set up the environment, the State Table Editor can be used. The prototype development system records how the user set up the environment the last time the State Table Editor was used.

The following is a description of setting up the environment and editing the State Table.

The State Table Editor consists of the following components:

1. The State Table Spreadsheet;
2. Displayed Collection of Graphical Objects called a Frame;
3. Command Menu Bar
4. Text Entry Window; and
5. A Displayed List of Choices that are relevant to the current mode.

Figure 13:
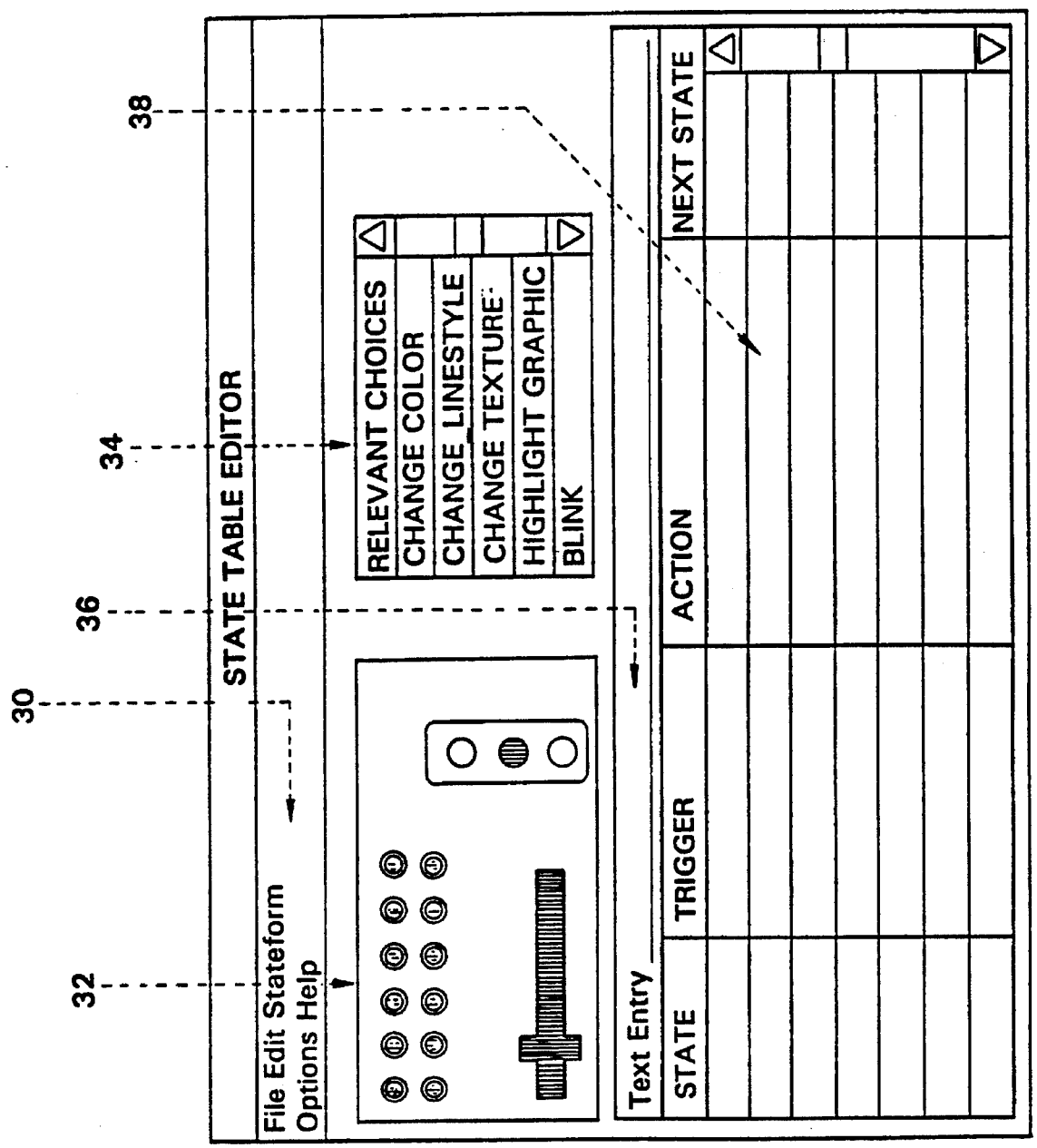
FIG. 13 is a screen display according to the invention.

A typical State Table Editor environment is shown in FIG. 13. The State Table includes a menu bar 30 describing options available in the State Table Editor. A Frame Display 32 graphically depicts virtual objects used by the State Table Editor to support the process of visual programming. Relevant Choices List 34 provides user selectable commands. Text Entry Window 36 allows the user to enter information such as new state names, user supplied action routine names, etc. The resultant system definitions are displayed in State Table 38.

By editing a State Table, a user specifies the behavior of a particular graphical display, i.e., a frame. This is frame created using the OE. This frame contains one or more graphic objects. The user selects one such frame to be controlled by the State Table using the State Table Editor.

The user also designates whether a new State Table is to be created or if an existing State Table is to be edited. In the latter case, an existing State Table is retrieved and loaded into memory for editing. During the editing, the user may load a different State Table, or a different frame. The other components of the environment are placed in the environment by the State Table Editor without user intervention.

Loading a frame or a preexisting State Table is accomplished by choosing the appropriate entry from the pull down menus in the menu bar, and choosing the desired file name.

Once the user has set up the State Table environment, the State Table can be edited. Editing the State Table includes filling in the cells of the State Table. Referring to FIG. 13, the State Table is organized like a four column spreadsheet. The State Table can have as many rows as required to specify the desired behavior. Each cell in the State Table contains information specific to that cell.

For example, if a particular cell in the event column has as its "subject" a particular knob, then the relevant list for that subject (and therefore cell) includes the various events that can be generated by the knob. This may include the events "MOUSE_UP", "MOUSE_DOWN", "KNOB_NEW VALUE", "KNOB_HAS_MIN_VAL", "KNOB_HAS_MAX_VAL". The cells in the state column and the next state column contain the names of states as previously designated by the user.

The relevant list for the state column is the list of all the states in the State Table. This includes any state which is already defined by another cell in the state or next state column.

The relevant list for the next state column includes all the states entered in the state table. In addition, certain keywords are also listed including "EXIT", "SUSPEND", "RESUME" and "RETURN".

Both the cells in the Event column and the Action column can refer to a virtual object as their "subject". Relating a cell to an object is performed by clicking on an event or action cell, and then clicking on a virtual object in the frame. The relevant list for a cell in the Event column depends on the virtual object referred to in the cell.

If no virtual object is associated with a cell, then a list of events that do not require a virtual object is displayed. This includes events such as "STATE_TABLE_STARTED", "STATE_ENTERED", and "STATE_EXITED". If a virtual object is associated with the cell, the relevant list then includes events that can be generated by the virtual object. For example, if a particular cell in the event column has an associated virtual object comprising knob, then the relevant list for that cell includes the various events that can be generated by the knob. This may include the events "MOUSE_UP", "MOUSE_DOWN", "KNOB_NEW_VALUE", "KNOB_HAS_MIN_VAL ", "KNOB_HAS_MAX_VAL".

The relevant list for a cell in the Action column depends on the virtual object which is referred to in the cell. If no virtual object is associated with the cell, then actions that do not require a virtual object are included in the relevant list. This includes actions such as "CHANGE_STATE_TABLE_PRIORITY", "START_COMMUNICATIONS", and "TERMINATE_PROGRAM".

If a virtual object is associated with the cell, then the relevant list comprises a list of actions which can be performed on the virtual object. For example, if a particular cell in the action column has as its associated virtual object a particular multi-state light virtual object, then the relevant list for that cell includes various actions that can be performed on the specified virtual object type. This may include the actions "CHANGE_STATE", "CHANGE_TO_DEFAULT_STATE", "HIDE", , "REVEAL", "BLINK".

The list of events and actions which are associated with each object type is defined by a user alterable dictionary including a list of events and actions supported by each object type. This allows the set of virtual object classes to grow, or the list of events and actions which virtual objects support to change, without changing the state table program source code.

Once an event or action is chosen, the event may be assigned one or more parameters. If a parameter is to be assigned, an additional window pops up and to allow the user to enter values for the parameters. Typical parameters property sheets are depicted in FIGS. 14 and 15.

Each field in the property sheet has a "set of allowed values". Some fields may receive numeric values, while other receive a name of a state of the virtual object, and others require the user to choose from a particular list of values. When the user clicks on a particular field in the property sheet, a parameter value window pops up, i.e., is displayed. This parameter value window allows the user to enter the value for the particular parameter. If the parameter has a fixed set of allowed values, a list of those values is shown. The user then clicks on the desired value.

The list of allowed values may come from one of two sources. It may come from the virtual object which is the subject of the cell being edited. For example, if the virtual object is a multi-state light, the names of the states of the light may be shown. Alternatively, the field may be defined as a "C" or other computer language type. If the field type is an enumerated type, i.e., limited to a predefined set of values, the list of allowed values is taken from the enumerated list for that type. For example, if the type of the field is ANCHOR_TYPE and the type was defined as:

```
typedef enum
    {RELATIVE_TO_CRT, RELATIVE_TO_FRAME,
ABSOLUTE, SCALED_TO_FRAME}
    ANCHOR_TYPE;
``` then the appropriate values are used for that field.

Finally, if the field is numeric or an arbitrary string, then a text entry field is used. Examples of parameter value windows are depicted in FIG. 16.

Figure 17:
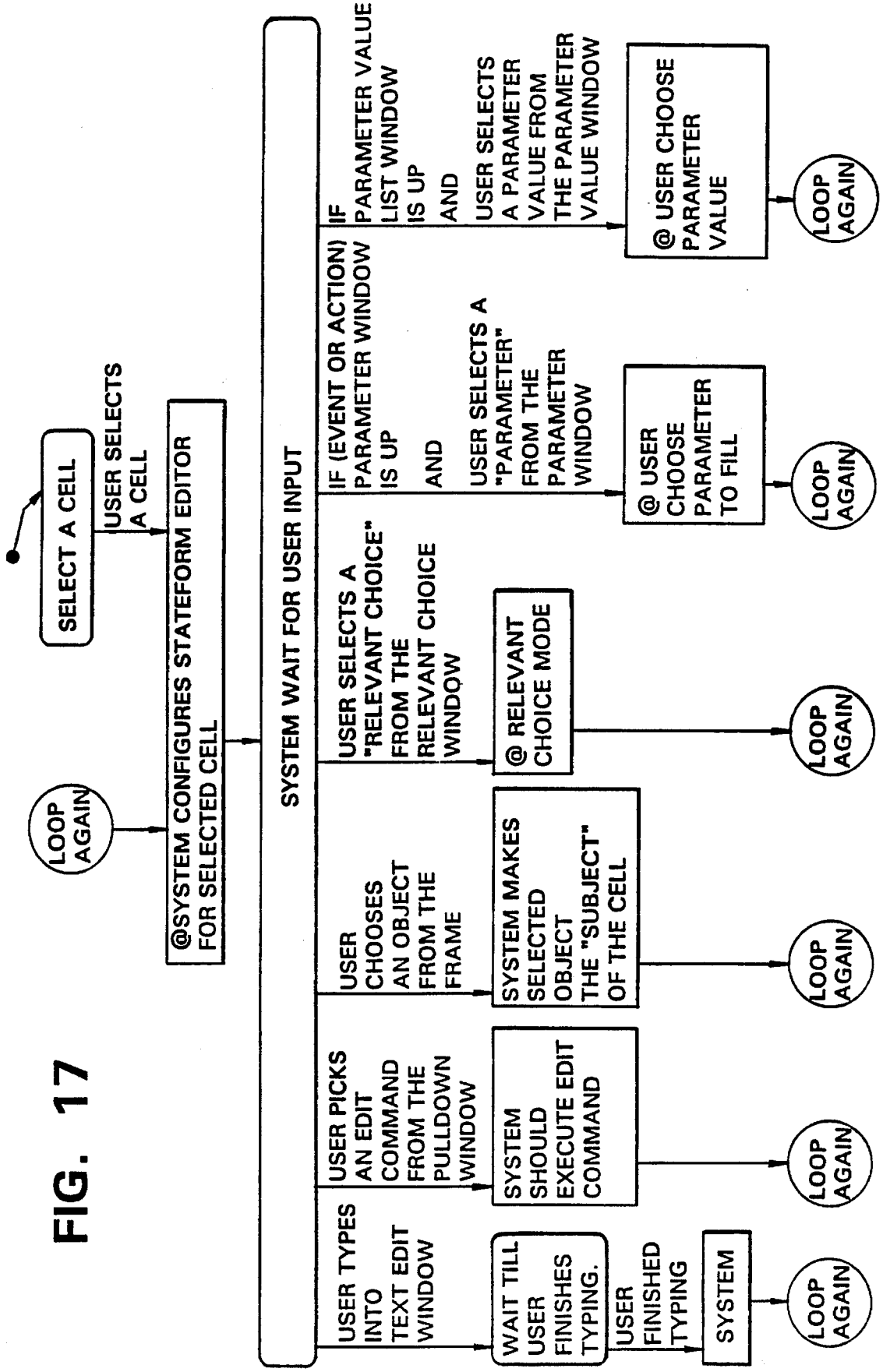
FIG. 17 is a flow chart of State Table Cell selection according to the invention.

The basic sequence of completing or filling in a State Table is to select a cell by clicking on it and either typing in a value using the edit text window or clicking on the appropriate items from other windows and menus. This process is depicted in the flow diagram of FIG. 17.

Initially, the user selects a cell and the system configures the State Table Editor for the selected cell. Details of the system table configuration routine are shown in FIGS. 18–20.

Figure 18:
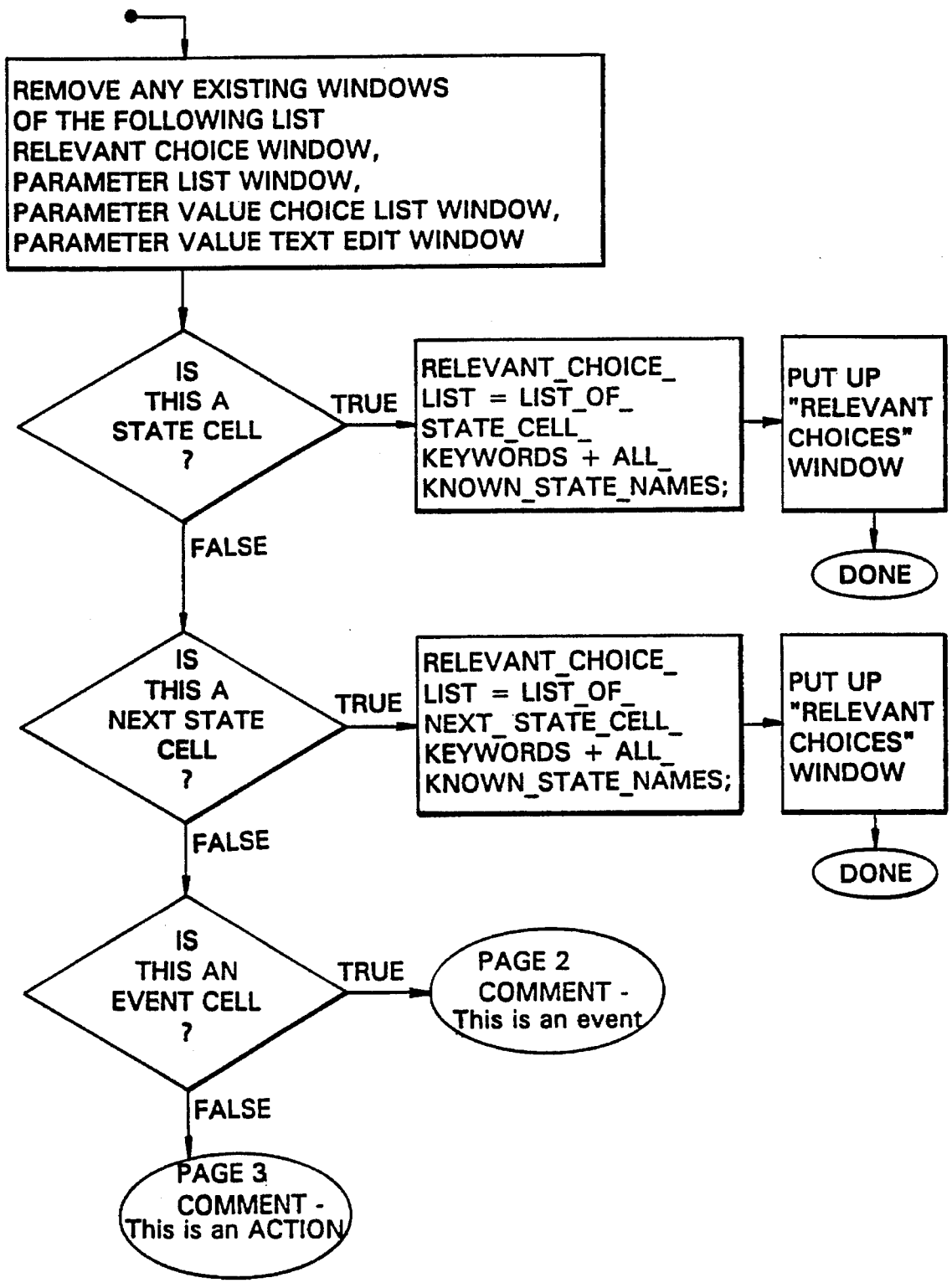
FIGS. 18–20, together, form a flow chart are flow charts of State Table Cell configuration performed according to the invention.

Referring to FIG. 18, the State Table Editor first removes any preexisting windows from the display. If the selected cell is a State cell, then a list of state cell keywords and all known state names are displayed in a window. If the cell is a Next State cell, then a list of next state cell keywords and all known state names is displayed in a window area. If the cell is an Event cell, event cell processing is performed in accordance with the flow diagram of FIG. 19.

Figure 19:
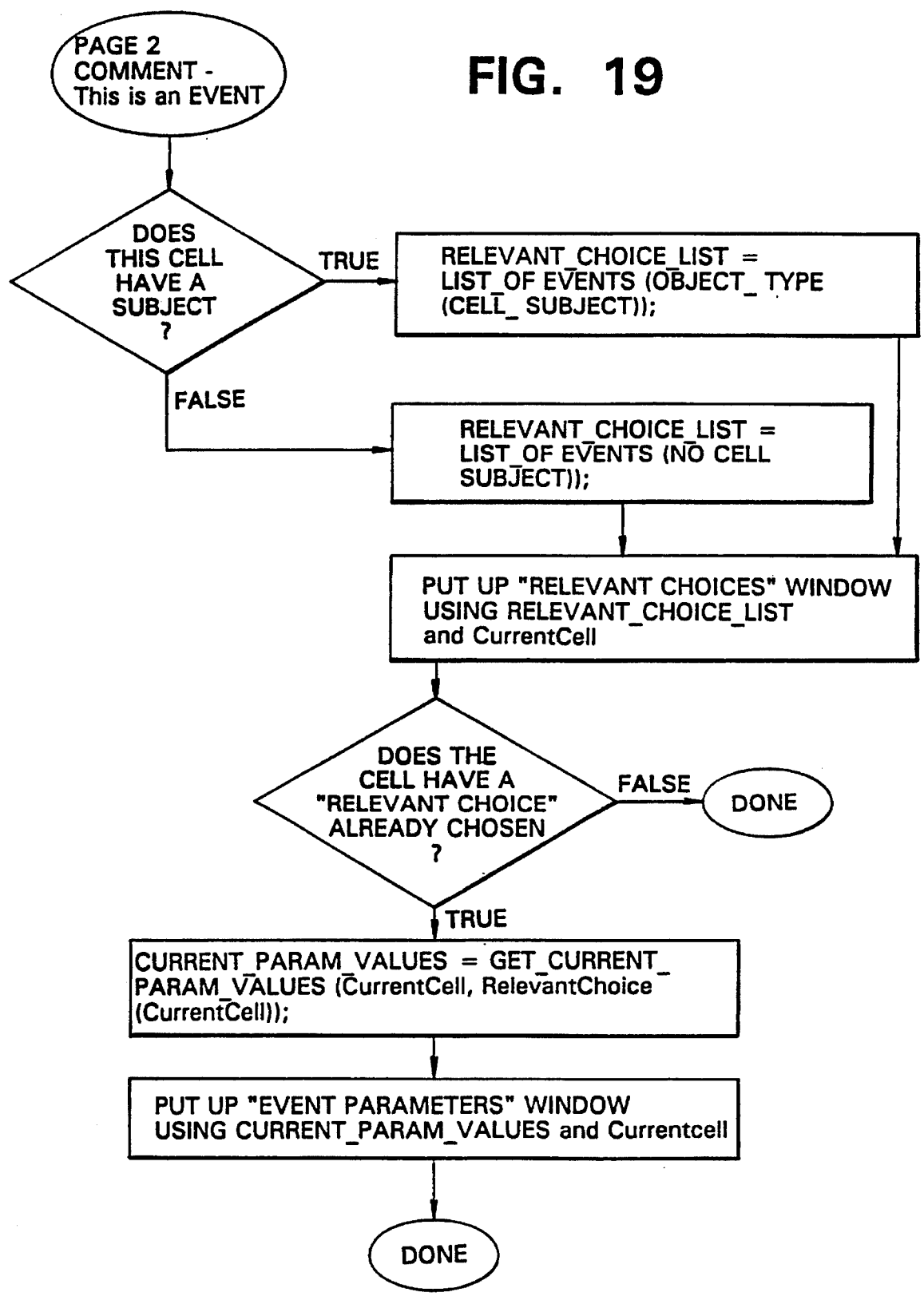
Figure 20:
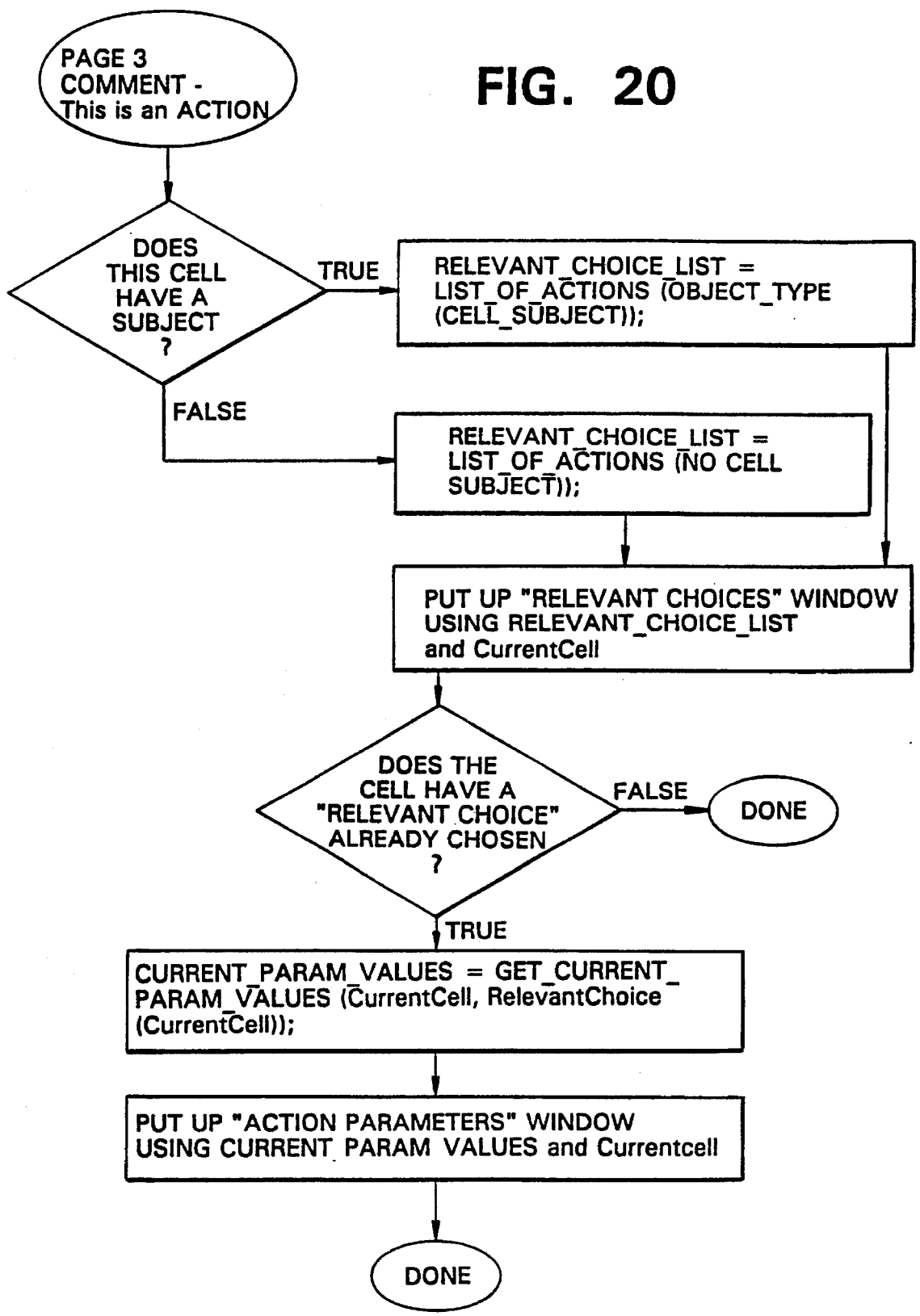

Referring to FIG. 19, if the cell has a subject, then the relevant choice list displayed includes a list of events for that virtual object type and the specified cell subject. If there is no subject associated with the Event cell, then a list of event corresponding to that type of cell is displayed. A timeout is an example of an event not requiring specification of a subject.

The list of relevant choices depends on the class of the object, the list being different for different object classes. Examples of lists of events related to specific object classes are depicted in FIG. 21. One such list is needed for each object class. Similar classes of objects may have some events of each list in common. The lists are stored in a data base.

If the cell does not have a .subject, then a list of events which require no subject is displayed. An example of such a list of events is shown in FIG. 22.

After the relevant choices associated with the Event cell are displayed, a check is performed to determine if a relevant choice for the cell has already been selected. If so, the current parameter values are set accordingly and displayed in an Event parameters window.

If the cell is not an Event cell, then the cell is interpreted as an Action cell. Referring to FIG. 22, a relevant choice window is displayed corresponding to whether a subject is associated with the Action cell. Action cells not requiring a subject include routines contained in a "C" library such as for computing a random number. The system further displays a Relevant Action parameters window if a cell has a relevant choice already chosen.

The list of relevant choice actions is determined in a way similar to that used to determined relevant choices of events. Example of lists of relevant actions for different object classes are depicted in FIG. 23.

If an action cell does not have a subject, then a list of actions which require not subject is displayed, as shown by example in FIG. 24.

Referring again to FIG. 17, once configured, the system waits for an input from a user. The input is classified into six types: the user (i) types text into an edit window, (ii) picks an edit command from a window, (iii) chooses a virtual object from a frame, (iv) selects an item from a relevant choice window, (v) selects a parameter form a window, or (vi) selects a parameter value from a parameter value window. If the user enters text, the system waits until the user finishes typing and supplies the text to the computer modelling system for parsing and further processing.

If the user designates an Edit command, the State Table Editor performs the chosen editing function. Selection of a virtual object causes the State Table Editor to make the selected virtual object the subject of the cell.

Figure 25:
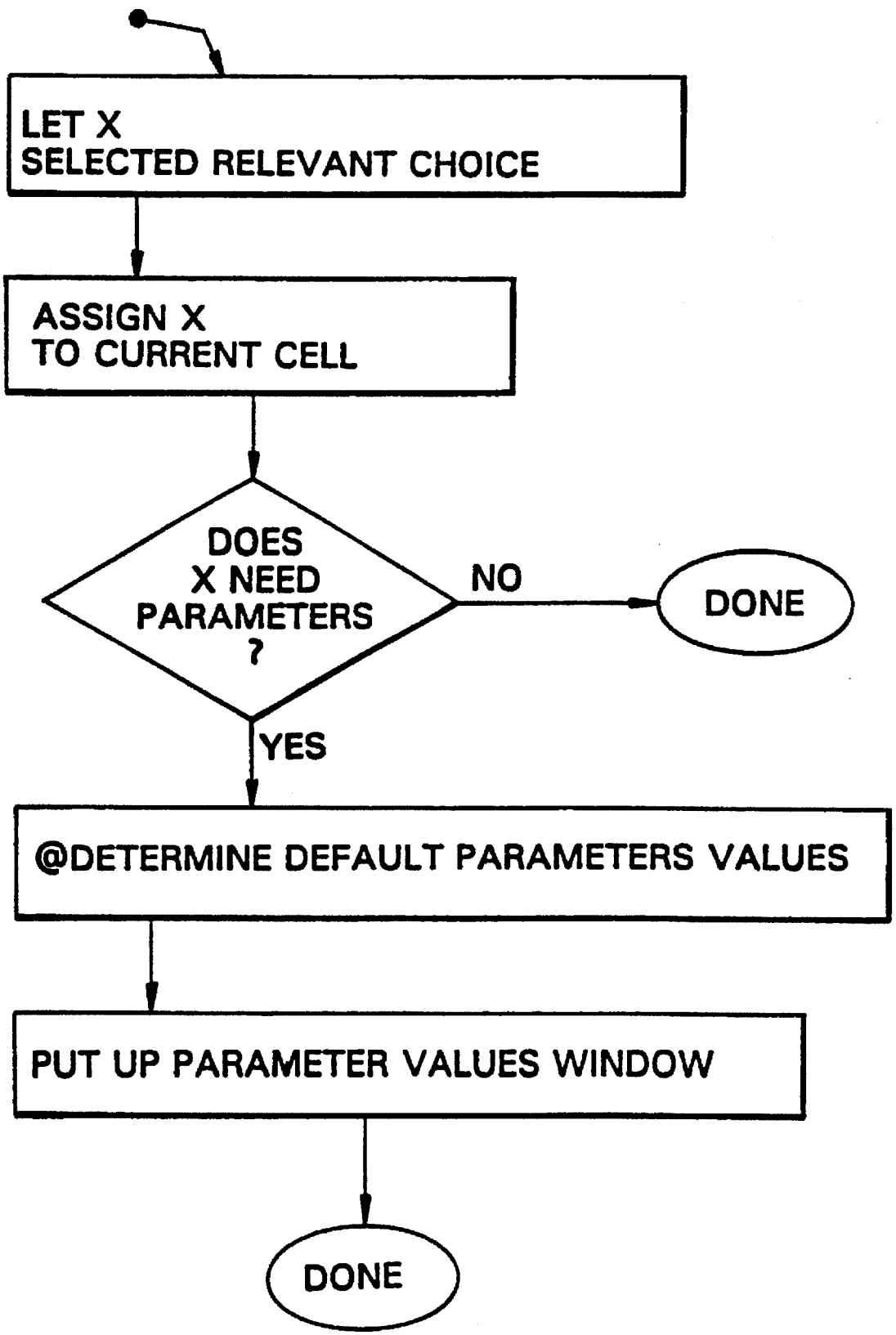
FIG. 25 is a flow chart of system operation in a relevant choice mode of operation.

If the user selects a relevant choice from a window, processing proceeds as shown in the flow chart of FIG. 25. As depicted, the selected choice is assigned to the cell. If the choice requires one or more parameters, processing is performed as shown in the flow chart of FIG. 26 to determine an appropriate default value for each required parameter.

Figure 26:
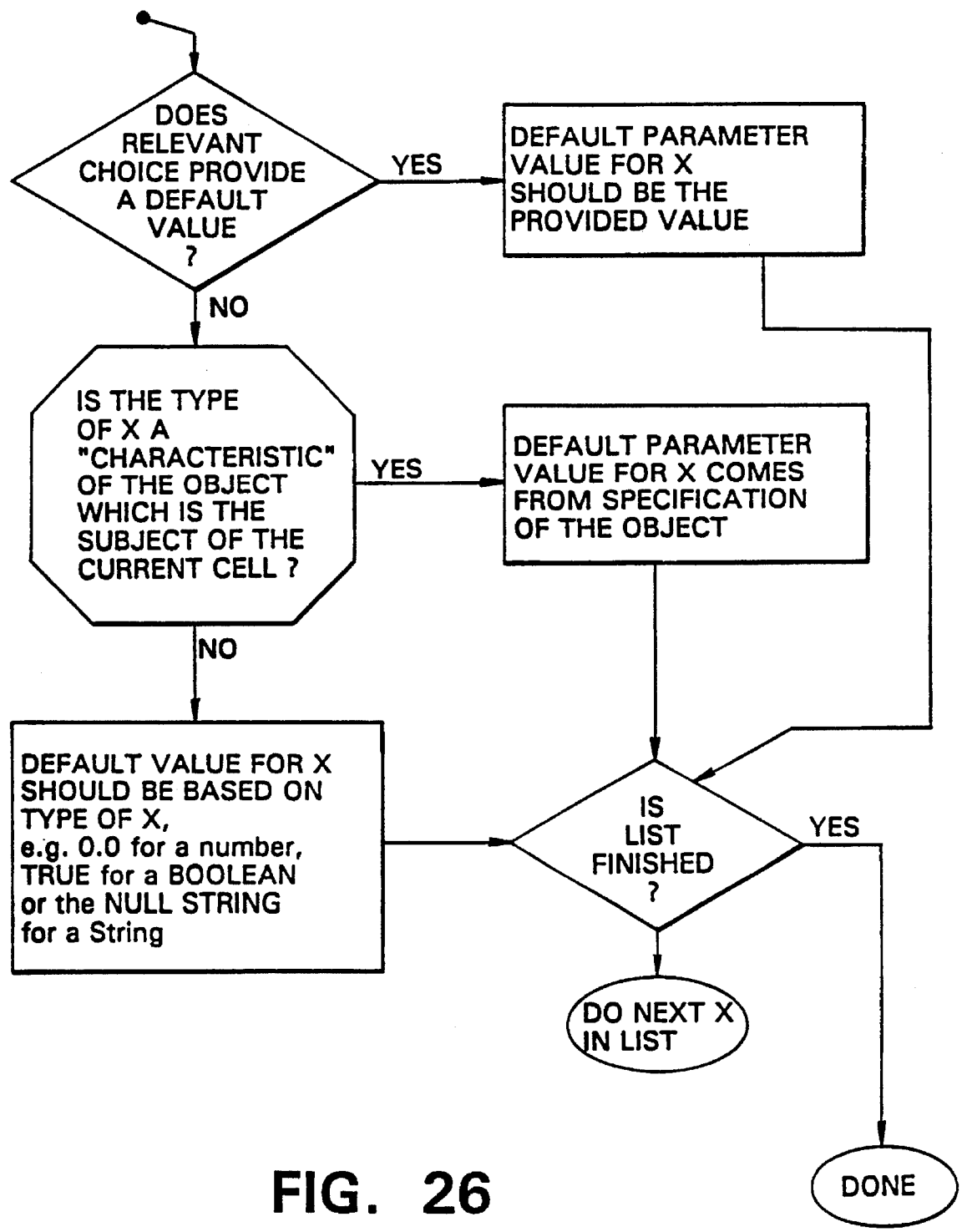
FIG. 26 is a flow chart depicting determination of default parameter values according to the invention.

Referring to FIG. 26, a check is first performed to determine if the relevant choice provides a default value. If not, then, if the type of choice is a characteristic of the virtual object which is the subject of the current cell, then a default parameter is provided corresponding to the specification of the virtual object. Alternatively, if the relevant choice is not a characteristic of the virtual object, then a default value is supplied based on the type of choice selected.

Figure 27:
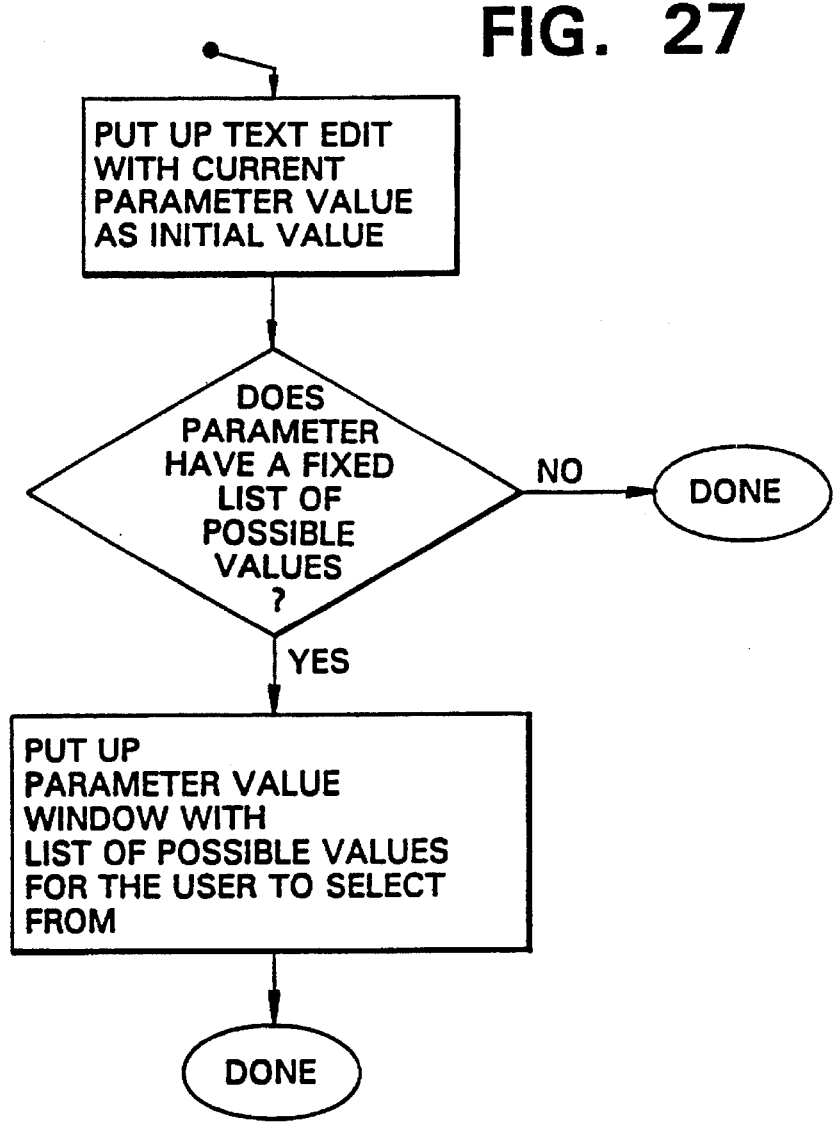
FIG. 27 is a flow chart depicting system operation in response to a user parameter selection.
Figure 28:
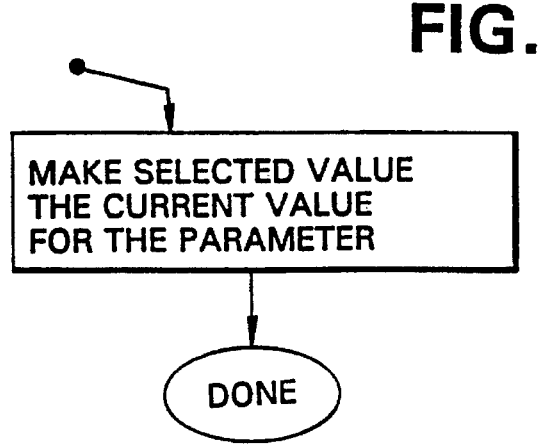
FIG. 28 is a flow chart depicting system operation in response to a user parameter value assignment selection.

Referring again to FIG. 17, if the event or action window is up and the user selects a parameter from the parameter window, processing continues as shown in FIG. 27 to allow the user to select a parameter to be specified. The chosen parameter is then made the current value. Alternatively, if the parameter value list window is up and the user selects a parameter, processing continues to allow the user to choose a parameter value as depicted in FIG. 28.

The following description is an example of using the State Table Editor and prototype development system according to the invention.

Figure 29:
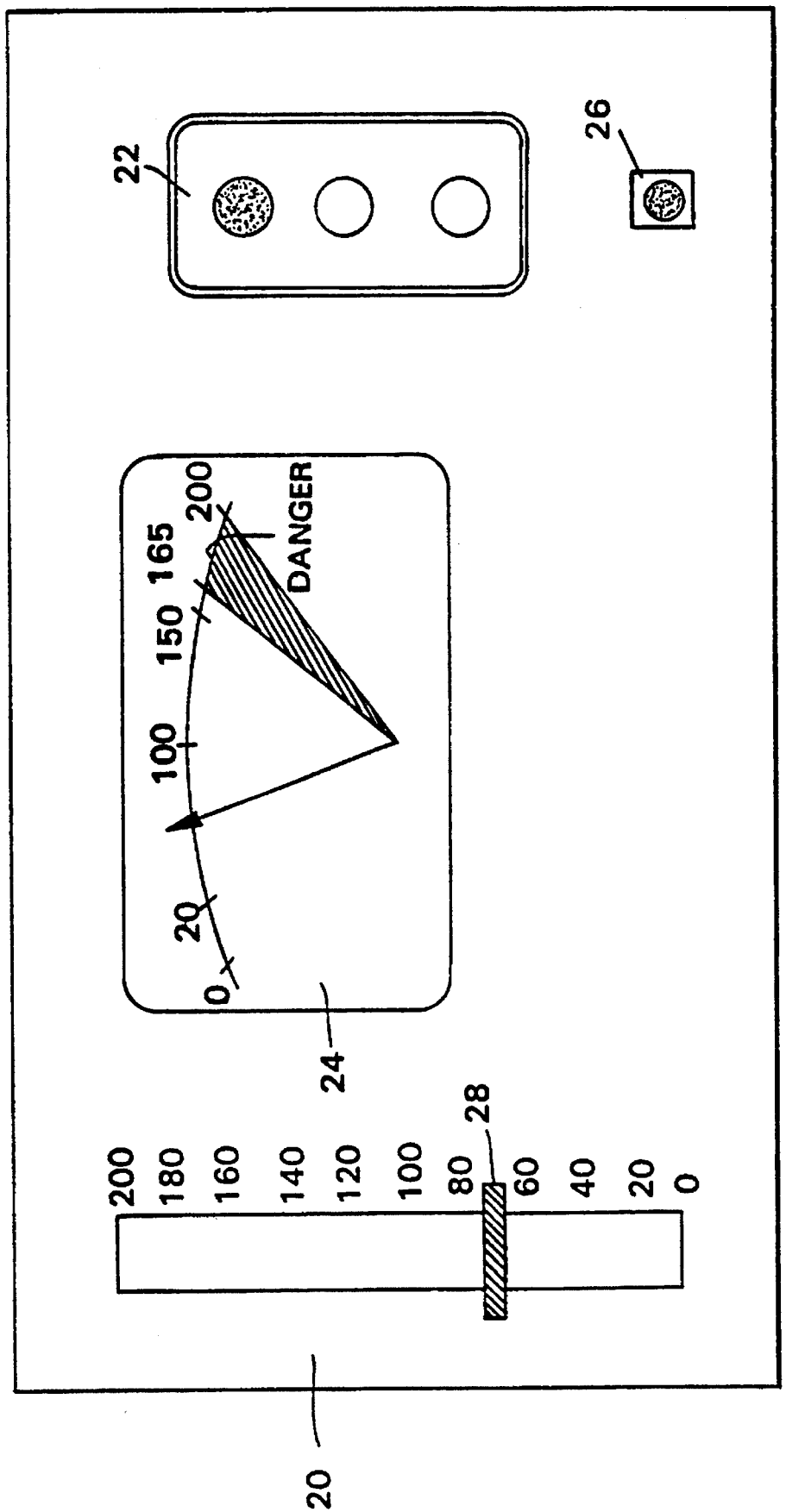
FIG. 29 is a graphic image of a simulation display.

The user first enters the Object Editor by typing 'object_editor' from the command prompt or by clicking on a command icon at a computer work station. Then, the user defines or retrieves a previously stored prototype. In this example, the prototype is the simplified control panel 20 for a train as shown in FIG. 29.

As described and defined using the Object Editor and Integration Editor, the prototype has two output virtual objects and two input virtual objects. The two output virtual objects are traffic light 22 and speedometer 24. The input virtual objects are push button 26 and a gas pedal represented by potentiometer 28.

For example, suppose that the operator determines that the control panel is to exhibit the following behavior. The main control is to be the speed control, i.e., sliding potentiometer 28. The train can travel at any speed from 0 to 200 miles per hour. Control panel 20 includes traffic light 22 which informs the operator of the maximum allowed train speed. If traffic light 22 is green, then the train may proceed at any speed. However, as indicated by the crosshatched area on the speedometer, speeds greater than 180 mph are dangerous and should not be used except under special circumstances.

When traffic light 22 is yellow, the train may not travel faster than 20 mph. When traffic light 22 is red, the train should stop.

In the prototype, traffic light 22 should be controlled by push button 26. Repeated pressing of push button 26 causes the traffic light sequence through the colors red, green and yellow. Initially the traffic light is red. Pressing button 26 once makes it turn to green. Pressing it again makes the light change to yellow. Pressing it again makes the light change to red.

After defining the desired operating rules, the user creates a State Table to implement these rules. The user creates an empty State Table using a main pulldown menu to select "State Table." This causes a display of a pulldown menu from which the user selects the "New State Table."

Next, the user brings up the Pick By Name window. Form the main pulldown menu, the user selects "Utilities" and, from the resultant pulldown menu, selects "Pick By Name". Then, from the State Table definition main pulldown menu, the user clicks on "Utilities". From the Utilities menu, the user clicks on "Focus Selection". From Focus Selection, the user clicks on the second entry in the menu, connecting the Pick By Name menu to the frame which the user has loaded into a Show window for display. Then, the Focus Selection window is removed by clicking on an appropriate field of the Focus Selection window. The user can then begin to enter the desired prototype behavior into the State Table.

The user must first arrange to have the Frame loaded when the prototype begins operation. This is accomplished by clicking on the first cell in the column of the State Table Editor labelled EVENT. IN response, a window titled "Relevant Choices" is displayed. From this window the user selects the entry "FIRST_TIME". The selected cell in the State Table Editor now contains the text FIRST_TIME.

The user next clicks on the first cell in the column labelled Action. In response, the "Relevant Choices" window changes to display context appropriate choices. In the "Pick By Name" Window, the user clicks on the top element, which is the frame itself. The "Relevant Choices" window now displays new choices applicable to the frame.

The user next selects the entry "Get_Frame" from the Pick By Name window. As a result, a window titled: "Arguments of Function: Get_Frame( )" appears. This window allows the user to change the parameters to the Get_Frame( ) action. Since the default parameters are appropriate, no change is required.

The first state to be created is titled RED. The user initially clicks on the first cell in the column labelled Next State, highlighting the display of the cell. As before, a Relevant Choices window will appear. The user clicks on the cell again causing a data entry window to appear. This follows the general rule in the State Table Editor that a second click on a cell causes a data entry window to be displayed, allowing the user to manually input values using alphanumeric keyboard entry.

The user then types "RED" into the table followed by a carriage return from the keyboard. The value RED then appears in the NEXT STATE Cell. Above the State Table editor work area are State Table editing commands. The user clicks on the command "Append Transition" to add a second empty row to the State Table.

Next, the user clicks on the second cell in the column labelled State. From the Relevant Choices menu, the user selects "RED" to create the state RED.

In the state RED, the user first sets the dial representing the speedometer to 0. To do this, the user clicks on the second cell in the EVENT column. From the relevant choices menu, the user selects the INITIALLY item. The initial behavior of the system in response to entry into the RED state is then specified in the Action column.

To specify the behavior, the user clicks on the second cell in the ACTION column. From the Pick_By_Name window, the user clicks on and highlights DIAL. This causes the dial to be made the subject of the cell.

From the Relevant Choices menu, the user next clicks on the Drive_Dial entry whereby window Arguments To Function: Drive_Dial are displayed. Since all the default values are appropriate, no change is made.

The user again clicks on the Action cell causing a data entry window to be displayed. The user adds a second blank line and selects the traffic light from the Pick By Name window. From the relevant choices menu, the user selects "Drive_Light". Since the default value given is the RED mode of the light, no change is required.

The user must next describe the behavior while in the RED State. The behavior in the RED state is to go to the GREEN state when push button 26 is operated or "clicked". No response is required when the user changes the speed using the potentiometer in the RED state.

To describe the behavior that should occur in response to button 26 being clicked in the RED state, another transition must be added. The user first clicks on the command "Append Transition". Since this transition is a continuation of the description of the behavior of the RED state, the user need not fill in the STATE name column.

The user then clicks on the EVENT column of the new transition which is the third cell in the column. From the Pick By Name window, the user clicks on the "Desired Speed Button." Alternatively, the user can click on the picture of the button, using the left button on the mouse.

Next, from the Relevant Choices menu, the user picks the BUTTON selection resulting in display of default event parameters. Since, in the example, all the default values are correct, no change is required.

Having defined the RED state, the user next defines the GREEN state. To do this, the user clicks on the NEXT_

STATE cell of the transition. Clicking on the cell a second time causes a data entry window to be displayed. The user defines the name of the state by typing "GREEN".

Next, the user fills in the GREEN State parameters to define the behavior for the GREEN state. First, the user creates the GREEN state by clicking on the "Append Transition" command. Since, three transitions are need in the GREEN state, the user clicks on the "Append Transition" command two more times, for a total of three times.

The user next clicks on the STATE cell of the first of the three transitions that have just been added. From the Relevant Choices Menu, the user clicks on GREEN. Now, the user clicks on the EVENT cell of that transition. From the Relevant Choices menu, the user defines the initial state by clicking on INITIALLY.

The initial behavior in the GREEN state is almost identical to the required behavior for the INITIALLY event of the Red state. Therefore, the quickest way to enter this action is to copy it from the RED state, and then change the details. To do this, the user first clicks on the action cell of the INITIALLY transition in the RED state. The user then clicks on the COPY CELL command. Next, the user clicks on the action cell of the first transition of the state and then clicks on the PASTE CELL command.

Next, the user clicks on the first row of the action cell causing a Function Parameters: Drive_Dial( ) window to be displayed. The user clicks on the second field in this window. From the new pop-up window displayed, the user selects the POTEN_VAL entry.

The user now clicks on the second row of this cell. The Function Parameters: Drive_Light( ) window is displayed in response. The user clicks on the second field in this window. This brings up a window with a list of modes relevant to the light. In the present example, the light can be in the "RED", "GREEN" or "YELLOW" modes, these modes therefore being displayed in the window. The clicks on the "GREEN" entry thereby entering "GREEN" value as the Drive_Light parameter. Alternatively, the user can click twice on the second field. In this case, a data entry window will be displayed into which the user can type the value "GREEN".

The next task in defining the operation of the prototype is to define the correct response to the user clicking on the button, or sliding the potentiometer. To do this, the user clicks on the second cell in the EVENT column of the transition. From the Pick By Name window, the user clicks on the potentiometer Desired Speed. Now, from the Relevant Choices menu, the user clicks on POTEN. Next, the user fills in the appropriate response to a change in value of the potentiometer.

To define the appropriate response to adjustment of the potentiometer, the user clicks on the Action cell of the transition. From the Pick By Name window, the user clicks on Traffic_Light. From the relevant choices window the user clicks on Drive_Dial. The Function Parameters: Drive_Light( ) window is then displayed. In this window the user clicks on the second cell which has displayed therein ZERO_VAL. A pop-up window displays available values. The user must then click on the POTEN_VAL value.

To define the YELLOW State, the user first creates three transitions using the Append Transition command. The first transition describes the initial behavior of this state. The user first clicks on the STATE column of the first transition of the YELLOW state and YELLOW is selected from the relevant choices column. The user next clicks on the EVENT column, and selects INITIALLY from the Relevant Choices menu.

The desired behavior is to limit the speed to no more than 20 mph in the YELLOW state. To do this, the user types in a short program which implements the desired behavior. The program can be entered by clicking twice on the Action cell of this transition, causing display of a data entry window.

The program is entered into the cell as follows:

```
Drive_Light ("Traffic_Light", "Yellow");
float desired_speed;
desired_speed = POTEN_VAL;
if (desired_speed > 20.0) desired_speed = 20.0;
Drive_Dial ("Speedometer", desired_speed);
```

Next, the user defines the response to the operator attempting to change the speed of the train. The user clicks on the EVENT cell of the second transition of the YELLOW state and selects the Pick-By-Name window select the Speed control.

The desired action for this cell is the same as for the INITIALLY action. To copy the action, the user clicks on the ACTION cell of the INITIALLY transition of the state, clicks on the command COPY CELL, and then clicks on the empty action cell below. To fill in the empty cell, the user clicks on the PASTE CELL command, causing the code to be pasted into the Action cell.

Finally, the user must describe the behavior if the user clicks on the change_light button while in the YELLOW state. To do this, the user clicks on the last cell in the EVENT column. From the Pick-By-Name window, the user clicks on the Change_Light window. From the relevant choices window, the user then clicks on the BUTTON event. Next, the user clicks on the last cell in the NEXT_STATE column. From the relevant choices menu, the user selects RED by clicking on the displayed term.

This completes filling in the State Table, shown in completed form in FIG. 30.

The user must next save and compile the State Table. First, the user clicks on the State Table Editor main pulldown menu. From this menu, the user selects the Logic Prototyping entry. This cause display of a flow chart like Logic Prototyping Control Panel.

In the Logic Prototyping window, the user should click on the command SAVE. This instructs the State Table Editor to save the State Table just entered into the warehouse. The user must give the State Table Editor a name by typing in "TRAIN", into the window which comes up, followed by pressing the <enter> key. The State Table is then saved.

To compile the State Table, the user must click on the COMPILE ATN command in the Logic Prototyping window. Finally, when the MAKE TASKS command in the Logic Prototyping window is highlighted, the user should click on the highlighted command. This completes the behavioral part of the prototype.

The final step is to run the State Table just created. To do this, the user invokes the Runtime component of the prototype development system. This is done by selecting the Session command in the main State Table Editor pulldown window. Next, the user clicks on the command Run Time Environment, initiating the Run Time components of the prototype development system.

Using standard simulation system procedures, the user selects the warehouse where the compiled State Table is located. From the Storage Contents window, the user first selects the file TRAIN, with a file type of ATN, loads, and runs the file causing the prototype to begin execution. The user operates and interacts with the prototype by, for example, changing the values of the speed control and pressing the button while watching the results on the speedometer and the traffic light.

As demonstrated, the process of creating a State Table is relatively simple. Most of the required information in a State Table can be entered with mouse clicks. When the default parameters that are entered into the State Table are not correct, the entries can be easily changed. When necessary, the user can click twice on any field, and manually type in or edit the desired text.

In summary, the prototype development system according to the invention provides a system and method for defining the responses and states of a simulated system using a series of context sensitive menus to generate state tables. The information from the state tables is used to generate program code used by the prototype development platform or a target platform to simulate a desired system.

Although the present invention has been described and illustrated in detail, it is clearly understood that the same is by way of illustration and example only and is not to be taken by way of limitation, the spirit and scope of the present invention being limited only by the terms of the appended claims. For example, although the State Table Editor has been described in the context of a system for simulating a physical system, the invention is also applicable to other systems such as real-time control, artificial intelligence, and other data processing systems the operation of which can be defined by a state transition table.

We claim:

1. A system for developing and executing and specifying interactive visual applications wherein dynamic data are mapped into coherently animated virtual objects and operator interaction facilities are provided to interact with the objects on the display, the system comprising:

a central processing unit responsive to operator control signals for deriving address and control signals;

a random access memory for providing instructions to said central processing unit in response to said address signals from said central processing unit;

a non-volatile storage medium for supplying said instructions to said random access memory in response to said control signals from said central processing unit;

a graphics display device responsive to said control signals from said central processing unit for displaying the objects; and operator input means for supplying said operator control signals to said central processing unit, said operator control signals including positional and alphanumeric components, said operator input means including:

(i) a locator/trigger device for supplying said positional signals to the central processing unit, and (ii) a data entry device for supplying said alphanumeric signals to said central processing unit;

said instructions including at least one functional module for defining operations of said central processing unit and including:

(i) an object editor module responsive to said operator control signals for deriving the virtual objects by relating a graphical appearance of said virtual objects to a behavior of said objects during execution by the system;

(ii) an integration editor module responsive to said operator control signals for mapping ones of the virtual objects into names of variables, the contents of memory locations of said random access memory corresponding to said named variables, said named variables being used for redrawing the virtual objects on the graphics display to reflect changes in the contents of the memory locations associated with said named variables and said named variables further supplying graphic access to data in response to said positional signals from said locator/trigger device and to screen locations of said virtual objects, (iii) an execution facility for redrawing ones of said virtual objects in response to at least one of: (i) dynamic data stored in said random access memory and (ii) operator control signals, the execution facility further being responsive to predetermined logic specification data;

(a) said logic specification data specifying sets of events and corresponding reactions which should occur in response to the respective events, a respective origin of the event, a state of the system wherein said state is a state in a finite state machine model of the system, wherein each of said events originating from at least one of (A) ones of said objects, (B) a system clock signal, (C) control signals from said central processing unit, (D) messages from other computer systems, or (E) changes in the contents of the named variables;

(b) said logic specification data further specifying the next state that the system should transition to after an event is received;

(c) said logic specification data further specifying the reactions that occur under control of the logic specification, ones of which affect ones of the objects displayed on the display device; and a state table editor responsive to said operator control signals for defining said logic specification by specifying:

(1) system states;

(2) events to be recognized in respective ones of said states;

(3) actions to be taken in response to respective ones of said events and states; and (4) next states to be entered in response to respective ones of said events and states.

2. The system of claim 1 wherein said logic specification is generated responsive to selection of the virtual objects displayed on the graphics display to fill in a state table including said events and conditions to be recognized and corresponding actions to be taken.

3. The system of claim 2 including means responsive to said operator control signals for entering state names of respective ones of said states into the state table.

4. The system of claim 3 wherein said means for entering said state names includes a data entry device.

5. The system of claim 3 wherein said means for entering said state names includes means for copying from one of said cells forming said state table to another of said cells forming said state table.

6. The system of claim 1 including means for specifying events and respective sources of said events by clicking with the locator/trigger device on the visual representation of the virtual object generating respective ones of said events.

7. The system of claim 6 including means responsive to said locator/trigger device for selectively inserting said logic specification data into said state table.

8. The system of claim 1 further comprising means for specifying said actions by clicking with the locator/trigger device on visual representations of the virtual objects to which said actions apply.

9. The system of claim 8 including means for selectively inserting ones of said actions into cells forming the state table.

10. The system of claim 9 wherein said means for selectively inserting comprises said locator/trigger device.

11. The system of claim 1 including non-volatile memory means for storing said logic specification in an open ASCII format and a description of objects aggregates in an open ASCII format, whereby for each object such description includes details of the object class, object interface to a controlling variable and object graphical primitives, attributes and transformations.

12. The system of claim 1 wherein said execution facility includes said logic specification and said execution facility is stored in said random access memory during a system execution mode of operation.

13. The system of claim 1 wherein said logic specification and object description is postprocessed and stored in the modeled system, wherein the modeled system exhibits a behavior substantially the same as a behavior of said model system.

14. The system of claim 13 wherein the logic specification and object description includes states and transition statements, each transition statement including: an event, an action list and a next state, each event including an event type and an event descriptor, an action list being a list of names of programs that are to be executed, and the next state being a name, the object description including, for any object, behavioral parameters, interface information and graphics information; the behavioral information being class dependent and capturing salient real-time behavior of the object class, the interface information identifying at least one variable through which the application interfaces with the operator interface, the graphics information including (i) graphics primitives and coordinates thereof, (ii) graphics transformations such as scaling, rotation, and translation and (iii) graphics attributes applicable to any primitive, such as color, line style, texture and fonts.

15. The system of claim 14 wherein at least some of the transition statements include a condition, the condition being any expression involving memory addresses.

16. The system of claim 1 wherein said instructions further include:

(i) an object editor module responsive to said operator control signals for defining the virtual objects by relating a graphical appearance of said virtual objects to a behavior of said objects during execution by the system;

(ii) an integration editor module responsive to said operator control signals for mapping ones of the virtual objects into names of variables, the contents of memory locations of said random access memory corresponding to said named variables, said named variables being used for redrawing the virtual objects on the graphics display to reflect changes in the contents of the memory locations associated with said named variables and said named variables further supplying graphic access to data in response to said positional signals from said locator/trigger device and to screen locations of said virtual objects, (iii) an execution facility for redrawing ones of said virtual objects in response to dynamic data stored in said random access memory and in response to operator control signals, the execution facility further responsive to predetermined logic specification data.

17. The system of claim 1 including means for the operator interface to communicate with an application by transferring data between the operator interface and the application.

18. The system of claim 1 wherein said logic specification data further specify predetermined conditions existing when the events occurred, and the state table editor further specifies conditions to be recognized in respective ones of said system states specified by the state table editor.

19. The system of claim 1 wherein the object editor module includes:

I. at least one of: (A) a first arrangement for creating or modifying custom graphics including facilities for: (i) precisely drawing graphic primitives, such as lines, circles, polygons and texts; (ii) manipulating at least one of the color, texture, line style and font graphic attributes of said primitives; (iii) combining such primitives to form hierarchical constructions; and (iv) selectively applying graphic transformations, such as scaling, translating, rotating and combinations thereof, to the primitives or hierarchical constructions thereof; and (B) a second arrangement for building custom graphics with another tool and importing custom graphics into the object editor; and II. A third arrangement for mapping user defined graphics derived by at least one of the first and second arrangements into objects with execution time behaviors, the execution time behaviors being mapped to the user defined graphics by selecting these graphics through pointing and clicking with the graphics input device, and by filling in class specific information into a class specific form by pointing and clicking with the graphics input device on the displayed graphics and using an alphanumeric data entry device, resulting in an association of the execution time behaviors to the imported graphics, the execution time behaviors including at least one of:

a. displaying dynamic data of the application as a user designed bar chart, b. displaying a finite, but dynamically varying, number of any of the user designed visual objects with execution behaviors specified herein in a clipped viewing area, c. displaying and controlling a user defined cursor having an arbitrary graphical looks inside a clipped viewing area, d. displaying dynamic real-time application data in a rotational manner, by rotating user defined or the imported graphics around a user defined center of rotation, e. displaying as a graphics overlay user defined animated graphics over the graphics produced by a user program, f. forming a correspondence between a set of user defined graphical representations and a finite set of natural numbers (1, 2, 3, . . . n), the natural numbers dynamically varying under application control and having only one representation of the set displayed at any given time based on the value of an index of the set, g. displaying dynamic real-time application data in a textual fashion as an ASCII string, using a font, h. displaying dynamic real-time application data as a user designed graph that is redrawn dynamically to illustrate the most recent data values, i. displaying dynamic real time application data as a set of user designed graphics translating along a straight line segment, j. forming mapping between a finite set of consecutive natural numbers and a rectangular collection of graphics and displaying the portion of the rectangular collection of graphics that corresponds to a dynamically computed, current value in the set of numbers inside a rectangular region, k. sending to the application a value selected dynamically from a finite set of values, while concurrently providing visual feedback by displaying one of a set of user designed graphics mapped to that value, where such value set is traversed in a fixed order, l. sending a user defined ASCII string to the application, the user defined ASCII string being statically associated with a user defined graphic appearing on the display, the user defined ASCII string being sent to the application in real-time whenever the user dynamically interfaces with the displayed graphics, m. defining and referencing a collection of graphics to be displayed or removed together under application control, n. sending to the application a character string generated by typing on a real hardware keyboard or by inputting through a virtual keyboard comprised of user defined graphics appearing on the display, after validation and display of the generated character string using a font, said character string being sent in real-time as the user manipulates the real or virtual keyboard, o. sending to the application ASCII data associated with user defined graphics appearing in a set of non-overlapping rectangular regions on the display, such that for every region, a distinct character or character string is sent, the ASCII data associated with user defined graphics being sent in real-time as the user manipulates the user defined graphics, p. sending to the application a continuous input value varying in a finite, continuous real-number range, and concurrently providing real-time visual feedback by rotating a set of user defined graphics around a user defined center of rotation, q. sending to the application an input signal including x,y coordinates derived by associating a user defined coordinate set with a user defined graphics region and selecting at execution time a point in the graphics region to thus map to the x,y coordinate set, r. sending to the application lists of ASCII strings contained in pop-up or pull-down menus, said menus including user designed graphics and a user designed look and feel while being manipulated, the strings in the menus being sent to the application in real-time by manipulating the graphics through the graphic input device, s. sending to the application a continuously varying input value from a finite continuous range while concurrently providing visual feedback by translating user designed graphics along a straight line segment mapped to a value range, t. causing the application to display graphics primitives and alter graphical attributes thereof such as color, font, texture and transform them, such as by rotating, translating, scaling, making visible and invisible, based on real-time values of an application variable, u. sending to the application a value from a finite set of discrete values, and providing concurrent visual feedback by rotating an image on the display around a point at predefined angles, v. forming correspondence between a graphics object including simultaneously displayed user designed and first and second graphic objects, and sending to the application the identity of the second object when the user interfaces with graphics of the first object, such correspondence being of a temporal nature and existing only when the first and second objects are simultaneously displayed, w. sending to the application a value from a finite set of discrete values and providing concurrent visual feedback by displaying mutually exclusive user designed graphics on the display, the traversal order of the set being determined at execution time by the user, x. visually displaying and interacting with application data structured as a collection of nodes and connecting arcs (or links), each node and link being capable of being individually addressed and queried, and each node and link being visually displayed on the display as a network employing user designed graphics, the data sent to the application being generated in response to a human interaction with at least one of the objects or being supplied to at least one of the objects through a simulated event generation mechanism, the application data being sent from the application to objects built with the subject object editor for display, the application data being the contents of a finite set of named application variables of various types contained in computer memory accessed by the application program, the application data reflecting the latest results of computations and other data manipulations performed by the application program.

20. The system of claim 19 wherein the imported graphics are graphics custom designed by the user.

21. The system of claim 19 wherein the imported graphics are derived from an external editing tool.

22. The system of claim 19 wherein the fonts are designed by the user.

23. The system of claim 19 wherein the fonts are scalable vector fonts.

24. The system of claim 19 wherein the fonts are user designed raster fonts.

25. The system of claim 19 wherein the fonts are system-provided fonts.

26. The system of claim 19 wherein a new correspondence occurs in response to the second object being replaced on the display by another object.

27. The system of claim 19 further including an integration editor facility for visually defining a run-time correspondence between an object and a named application variable such that a change in application data causes a redrawing of the corresponding graphics object in accordance with its behavioral class.

28. The system of claim 27 wherein manipulation of the graphics object causes a change of the corresponding application data.

29. The system of claim 19 wherein the execution time behaviors include building new, more complex objects through a combination of the above behaviors by making an object part of another object.

30. The system of claim 19 wherein the execution time behaviors include manipulating a collection of objects including multiple hierarchical objects as an entity rather than as individual objects.

31. The system of claim 19 wherein the execution time behaviors include dynamically instancing any number of objects and altering the position thereof and number of instances displayed based on application data.

32. The system of claim 19 wherein all of the execution time behaviors a–x are included, as are the execution time behaviors of claims 29–31.

33. A system for enabling visual applications to be specified, comprising:

a central processing unit responsive to operator control signals for deriving address and control signals;

a random access memory for providing instructions to said central processing unit in response to said address signals from said central processing unit;

a non-volatile storage medium for supplying said instructions to said random access memory in response to said control signals from said central processing unit;

a graphics display device responsive to said control signals from said central processing unit for displaying the objects; and operator input means for supplying said operator control signals to said central processing unit, said operator control signals including positional and alphanumeric components, said operator input means including:
 (i) a locator/trigger device for supplying said positional signals to the central processing unit, and
 (ii) a data entry device for supplying said alphanumeric signals to said central processing unit;

said instructions including at least one functional module for defining operations of said central processing unit and including:

an object editor module responsive to said operator control signals for deriving virtual objects by relating a graphical appearance of said virtual objects to a behavior of said objects during execution by the system, the object editor module being arranged so a user can import graphics; the object editor module assigning execution time behaviors (i) to said imported graphics or (ii) to user designed graphics; the object editor module having:

a drawing capability for supporting creation of custom graphics providing the user with the capabilities of: (i) precisely drawing graphic primitives, such as lines, circles, rectangles, polygons and texts; (ii) manipulating attributes of at least one of color, texture, line style and font; (iii) selectively applying graphic transformations, such as scaling, translation, rotation and combinations thereof, to the primitives; and (iv) combining such primitives to form more complex constructions; the execution time behaviors being mapped to the imported graphics by (i) selecting graphics on the display through pointing and clicking with the graphics input device, and (ii) filling in class specific information by pointing and clicking with the graphics input device on the displayed graphics and using an alphanumeric data entry device, resulting in an association of the execution time behaviors to the imported graphics, the execution time behaviors including at least one of:

a. displaying dynamic data of the application as a user designed bar chart, b. displaying a finite, but dynamically varying, number of any of the user designed visual objects with execution behaviors specified herein in a clipped viewing area, c. displaying and controlling a user defined cursor having an arbitrary graphical looks inside a clipped viewing area, d. displaying dynamic real-time application data in a rotational manner, by rotating user defined or the imported graphics around a user defined center of rotation, e. displaying as a graphics overlay user defined animated graphics over the graphics produced by a user program, f. forming a correspondence between a set of user defined graphical representations and a finite set of natural numbers (1, 2, 3, ... n), the natural numbers dynamically varying under application control and having only one representation of the set displayed at any given time based on the value of an index of the set, g. displaying dynamic real-time application data in a textual fashion as an ASCII string, using a font, h. displaying dynamic real-time application data as a user designed graph that is redrawn dynamically to illustrate the most recent data values, i. displaying dynamic real time application data as a set of user designed graphics translating along a straight line segment, j. forming mapping between a finite set of consecutive natural numbers and a rectangular collection of graphics and displaying the portion of the rectangular collection of graphics that corresponds to a dynamically computed, current value in the set of numbers inside a rectangular region, k. sending to the application a value selected dynamically from a finite set of values, while concurrently providing visual feedback by displaying one of a set of user designed graphics mapped to that value, where such value set is traversed in a fixed order, l. sending a user defined ASCII string to the application, the user defined ASCII string being statically associated with a user defined graphic appearing on the display, the user defined ASCII string being sent to the application in real-time whenever the user dynamically interfaces with the displayed graphics, m. defining and referencing a collection of graphics to be displayed or removed together under application control, n. sending to the application a character string generated by typing on a real hardware keyboard or by inputting through a virtual keyboard comprised of user defined graphics appearing on the display, after validation and display of the generated character string using a font, said character string being sent in real-time as the user manipulates the real or virtual keyboard, o. sending to the application ASCII data associated with user defined graphics appearing in a set of non-overlapping rectangular regions on the display, such that for every region, a distinct character or character string is sent, the ASCII data associated with user defined graphics being sent in real-time as the user manipulates the user defined graphics, p. sending to the application a continuous input value varying in a finite, continuous real-number range, and concurrently providing real-time visual feedback by rotating a set of user defined graphics around a user defined center of rotation, q. sending to the application an input signal including x,y coordinates derived by associating a user defined coordinate set with a user defined graphics region and selecting at execution time a point in the graphics region to thus map to the x,y coordinate set, r. sending to the application lists of ASCII strings contained in pop-up or pull-down menus, said menus including user designed graphics and a user designed look and feel while being manipulated, the strings in the menus being sent to the application in real-time by manipulating the graphics through the graphic input device, s. sending to the application a continuously varying input value from a finite continuous range while concurrently providing visual feedback by translating user designed graphics along a straight line segment mapped to a value range, t. causing the application to display graphics primitives and alter graphical attributes thereof such as color, font, texture and transform them, such as by rotating, translating, scaling, making visible and invisible, based on real-time values of an application variable, u. sending to the application a value from a finite set of discrete values, and providing concurrent visual feedback by rotating an image on the display around a point at predefined angles, v. forming correspondence between a graphics object including simultaneously displayed user designed and first and second graphic objects, and sending to the application the identity of the second object when the user interfaces with graphics of the first object, such correspondence being of a temporal nature and existing only when the first and second objects are simultaneously displayed, w. sending to the application a value from a finite set of discrete values and providing concurrent visual feedback by displaying mutually exclusive user designed graphics on the display, the traversal order of the set being determined at execution time by the user, x. visually displaying and interacting with application data structured as a collection of nodes and connecting arcs (or links), each node and link being capable of being individually addressed and queried, and each node and link being visually displayed on the display as a network employing user designed graphics, the data sent to the application means being generated in response to a human interaction or a simulated event generation mechanism responding to a graphical operator interface built with said modeling system, the application data that is displayed being sent from the application to the graphical operator interface built with the subject modelling system, the application data being a finite set of named application variables of various types contained in computer memory accessed by the application program, the application data reflecting the latest results of computations and other data manipulations performed by the application program.

34. The system of claim 33 wherein all of the execution time behaviors a–x are included, as are the following execution time behaviors:

building new, more complex objects through a combination of the above behaviors by making an object part of another object;

manipulating a collection of objects including multiple hierarchical objects as an entity rather than as individual objects; and dynamically initiating any number of objects and altering the position thereof and number of instances displayed based on application data.

35. A modeling, simulation, specification and source code generation system for at least one graphical, data driven operator interface, comprising:

a graphics input device responsive to user inputs for deriving a positional signal;

a processor unit including:

an object editor module responsive to said operator control signals for deriving virtual objects by relating a graphical appearance of said virtual objects to a behavior of said objects during execution by the system, the object editor module being arranged so a user can import graphics, the object editor module assigning execution time behaviors (i) to said imported graphics or (ii) to user designed graphics, the object editor module having:

I. at least one of: (A) a first arrangement for creating and modifying custom graphics including facilities for: (i) precisely drawing graphic primitives, such as lines, circles, polygons and texts; (ii) manipulating at least one of the color, texture, line style, and font graphic attributes of said primitives; (iii) combining such primitives to form hierarchical constructions; and (iv) selectively applying graphic transformations, such as scaling, translating, rotating and combinations thereof, to the primitives or hierarchical constructions thereof and; (B) a second arrangement for building custom graphics with another tool and importing custom graphics into the object editor; and (II) a third arrangement for mapping user defined graphics derived by at least one of the first and second arrangements into objects with execution time behaviors, the execution time behaviors being mapped to the user defined graphics by selecting these graphics through pointing and clicking with the graphics input device, and by filling in class specific information into a class specific form by pointing and clicking with the graphics input device on the displayed graphics and using an alphanumeric data entry device, resulting in an association of the execution time behaviors to the imported graphics, the execution time behaviors including at least one of:

a. displaying dynamic data of the application as a user designed bar chart, b. displaying a finite, but dynamically varying, number of any of the user designed visual objects with execution behaviors specified herein in a clipped viewing area, c. displaying and controlling a user defined cursor having an arbitrary graphical look inside a clipped viewing area, d. displaying dynamic real-time application data in a rotational manner, by rotating user defined or the imported graphics around a user defined center of rotation, e. displaying as a graphics overlay user defined animated graphics over the graphics produced by a user program, f. forming a correspondence between a set of user defined graphical representations and a finite set of natural numbers (1, 2, 3, . . . n), the natural numbers dynamically varying under application control and having only one representation of the set displayed at any given time based on the value of an index of the set, g. displaying dynamic real-time application data in a textual fashion as an ASCII string, using a font, h. displaying dynamic real-time application data as a user designed graph that is redrawn dynamically to illustrate the most recent data values, i. displaying dynamic real time application data as a set of user designed graphics translating along a straight line segment, j. forming mapping between a finite set of consecutive natural numbers and a rectangular collection of graphics and displaying the portion of the rectangular collection of graphics that corresponds to a dynamically computed, current value in the set of numbers inside a rectangular region, k. sending to the application a value selected dynamically from a finite set of values, while concurrently providing visual feedback by displaying one of a set of user designed graphics mapped to that value, where such value set is traversed in a fixed order, l. sending a user defined ASCII string to the application, the user defined ASCII string being statically associated with a user defined graphic appearing on the display, the user defined ASCII string being sent to the application in real-time whenever the user dynamically interfaces with the displayed graphics, m. defining and referencing a collection of graphics to be displayed or removed together under application control, n. sending to the application a character string generated by typing on a real hardware keyboard or by inputting through a virtual keyboard comprised of user defined graphics appearing on the display, after validation and display of the generated character string using a font, said character string being sent in real-time as the user manipulates the real or virtual keyboard, o. sending to the application ASCII data associated with user defined graphics appearing in a set of non-overlapping rectangular regions on the display, such that for every region, a distinct character or character string is sent, the ASCII data associated with user defined graphics being sent in real-time as the user manipulates the user defined graphics, p. sending to the application a continuous input value varying in a finite, continuous real-number range, and concurrently providing real-time visual feed-back by rotating a set of user defined graphics around a user defined center of rotation, q. sending to the application an input signal including x,y coordinates derived by associating a user defined coordinate set with a user defined graphics region and selecting at execution time a point in the graphics region to thus map to the x,y coordinate set, r. sending to the application lists of ASCII strings contained in pop-up or pull-down menus, said menus including user designed graphics and a user designed look and feel while being manipulated, the strings in the menus being sent to the application in real-time by manipulating the graphics through the graphic input device, s. sending to the application a continuously varying input value from a finite continuous range while concurrently providing visual feedback by translating user designed graphics along a straight line segment mapped to a value range, t. causing the application to display graphics primitives and alter graphical attributes thereof such as color, font, texture and transform them, such as by rotating, translating, scaling, making visible and invisible, based on real-time values of an application variable, u. sending to the application a value from a finite set of discrete values, and providing concurrent visual feedback by rotating an image on the display around a point at predefined angles, v. forming correspondence between a graphics object including simultaneously displayed user designed and first and second graphic objects, and sending to the application the identity of the second object when the user interfaces with graphics of the first object, such correspondence being of a temporal nature and existing only when the first and second objects are simultaneously displayed, w. sending to the application a value from a finite set of discrete values and providing concurrent visual feedback by displaying mutually exclusive user designed graphics on the display, the traversal order of the set being determined at execution time by the user, x. visually displaying and interacting with application data structured as a collection of nodes and connecting arcs (or links), each node and link being capable of being individually addressed and queried, and each node and link being visually displayed on the display as a network employing user designed graphics;

the data sent to the application being generated in response to a human interaction with at least one of the objects or being supplied to at least one of the objects through a simulated event generation mechanism, the application data being sent from the application to objects built with the subject object editor for display, the application data being the contents of a finite set of named application variables of various types contained in computer memory accessed by the application program, the application data reflecting the latest results of computations and other data manipulations performed by the application program;

the processor unit further including: a code generation module for (i) processing object description information including behavioral parameters, interface information and graphics information; the behavioral information being class dependent and capturing the salient real-time behavior of the object class and (ii) generating graphics source code, which after suitable post-processing, in the form of assembly or compilation, link-editing or interpretation, causes an image similar to the one appearing on the model system to appear on the model(ed) system, where the two images have similar animation behaviors when subjected to similar data.

36. The system of claim 35 wherein the code generating module responds to object description information including behavioral parameters, interface information and graphics information to generate graphics source code in any language which can be described formally through a grammar, the behavioral information being class dependent and capturing the salient real-time behavior of the object class, the interface information identifying a variable through which the application interfaces with the operator interface, the graphics information including (i) graphics primitives and coordinates thereof, and (ii) graphics transformations such as scaling rotating, translating, and (iii) graphics attributes applicable to any primitive, such as color, line style, texture and fonts.

37. A modeling, simulation, specification and source code generation system for at least one graphical data driven, interactive operator interface capable of executing similarly on a model system and on a modeled system, comprising:

a graphic input device responsive to user inputs for deriving a positional signal;

a processor unit including:
(1) an input module;
(2) an object editor module responsive to said operator control signals for deriving virtual objects by relating a graphical appearance of said virtual objects to a behavior of said objects during execution by the system, the object editor module being arranged so a user can import graphics, the object editor module assigning execution time behaviors (i) to said imported graphics or (ii) to a user designed graphics, the object editor module having:

I. at least one of: (A) a first arrangement for creating and modifying custom graphics including facilities for: (i) precisely drawing graphic primitives, such as lines, circles, polygons and texts; (ii) manipulating of at least one of the color, texture, line style, font and texture graphic attributes of said primitives; (iii) combining such primitives to form hierarchical constructions; and (iv) selectively applying graphic transformations, such as scaling, translating, rotating and combinations thereof, to the primitives or hierarchical constructions thereof; and (B) a second arrangement for building custom design graphics with another tool and importing custom design graphics into the object editor; and (II) a third arrangement for mapping user defined graphics derived by one of (i)–(iv) into objects with execution time behaviors being mapped to the user defined graphics by selecting these graphics through pointing and clicking with the graphics input device, and by filling in class specific information by pointing and clicking with the graphics input device on the displayed graphics and using an alphanumeric data entry device, resulting in an association of the execution time behaviors to the imported graphics, the execution time behaviors including at least one of:

a. displaying dynamic data of the application as a user designed bar chart, b. displaying a finite, but dynamically varying, number of any of the user designed visual objects with execution behaviors specified herein in a clipped viewing area, c. displaying and controlling a user defined cursor having an arbitrary graphical look inside a clipped viewing area, d. displaying dynamic real-time application data in a rotational manner, by rotating user defined or the imported graphics around a user defined center of rotation, e. displaying as a graphics overlay user defined animated graphics over the graphics produced by a user program, f. forming a correspondence between a set of user defined graphical representations and a finite set of natural numbers (1, 2, 3, ... n), the natural numbers dynamically varying under application control and having only one representation of the set displayed at any given time based on the value of an index of the set, g. displaying dynamic real-time application data in a textual fashion as an ASCII string, using a font, h. displaying dynamic real-time application data as a user designed graph that is redrawn dynamically to illustrate the most recent data values, i. displaying dynamic real time application data as a set of user designed graphics translating along a straight line segment, j. forming mapping between a finite set of consecutive natural numbers and a rectangular collection of graphics and displaying the portion of the rectangular collection of graphics that corresponds to a dynamically computed, current value in the set of numbers inside a rectangular region, k. sending to the application a value selected dynamically from a finite set of values, while concurrently providing visual feedback by displaying one of a set of user designed graphics mapped to that value, where such value set is traversed in a fixed order, l. sending a user defined ASCII string to the application, the user defined ASCII string being statically associated with a user defined graphic appearing on the display, the user defined ASCII string being sent to the application in real-time whenever the user dynamically interfaces with the displayed graphics, m. defining and referencing a collection of graphics to be displayed or removed together under application control, n. sending to the application a character string generated by typing on a real hardware keyboard or by inputting through a virtual keyboard comprised of user defined graphics appearing on the display, after validation and display of the generated character string using a font, said character string being sent in real-time as the user manipulates the real or virtual keyboard, o. sending to the application ASCII data associated with user defined graphics appearing in a set of non-overlapping rectangular regions on the display, such that for every region, a distinct character or character string is sent, the ASCII data associated with user defined graphics being sent in real-time as the user manipulates the user defined graphics, p. sending to the application a continuous input value varying in a finite, continuous real-number range, and concurrently providing real-time visual feedback by rotating a set of user defined graphics around a user defined center of rotation, q. sending to the application an input signal including x,y coordinates derived by associating a user defined coordinate set with a user defined graphics region and selecting at execution time a point in the graphics region to thus map to the x,y coordinate set, r. sending to the application lists of ASCII strings contained in pop-up or pull-down menus, said menus including user designed graphics and a user designed look and feel while being manipulated, the strings in the menus being sent to the application in real-time by manipulating the graphics through the graphic input device, s. sending to the application a continuously varying input value from a finite continuous range while concurrently providing visual feedback by translating user designed graphics along a straight line segment mapped to a value range, t. causing the application to display graphics primitives and alter graphical attributes thereof such as color, font, texture and transform them, such as by rotating, translating, scaling, making visible and invisible, based on real-time values of an application variable, u. sending to the application a value from a finite set of discrete values, and providing concurrent visual feedback by rotating an image on the display around a point at predefined angles, v. forming correspondence between a graphics object including simultaneously displayed user designed and first and second graphic objects, and sending to the application the identity of the second object when the user interfaces with graphics of the first object, such correspondence being of a temporal nature and existing only when the first and second objects are simultaneously displayed, w. sending to the application a value from a finite set of discrete values and providing concurrent visual feedback by displaying mutually exclusive user designed graphics on the display, the traversal order of the set being determined at execution time by the user, x. visually displaying and interacting with application data structured as a collection of nodes and connecting arcs (or links), each node and link being capable of being individually addressed and queried, and each node and link being visually displayed on the display as a network employing user designed graphics;

the data sent to the application being generated in response to a human interaction with at least one of the objects or being supplied to at least one of the objects through a simulated event generation mechanism, the application data being sent from the application to objects built with the subject object editor for display, the application data being the contents of a finite set of named application variables of various types contained in computer memory accessed by the application program, the application data reflecting the latest results of computations and other data manipulations performed by the application program;

(3) a state table editor responsive to operator control signals for defining a logic specification by specifying:

(a) system states;
(b) events to be recognized in respective ones of said states;
(c) actions to be taken in response to respective ones of said events and states; and
(d) next states to be entered in response to respective ones of said events and states; and (4) a code generation module for generating (a) portable graphics code from an object description including behavioral parameters, interface information and graphics information; the behavioral information being class dependent and capturing salient real-time behavior of the object class, the interface information identifying a variable through which the application interfaces with the operator interface, the graphics information including graphics primitives and coordinates thereof, graphics transformations such as scaling, rotating, translating and graphics attributes applicable to any primitive, such as color, line style, texture and fonts, and (b) logic control code from a logic specification including states and transition statements, each transition statement including: an event, an action list and a next state; each event including an event type and an event descriptor, a condition being any expression involving memory addresses, an action list being a list of names of programs that are to be executed, and the next state being a name; which code, after suitable post-processing causes images with similar appearances, animation behaviors, and interactive behaviors to appear on the model(ed) system.

* * * * *